US007690989B2

(12) United States Patent
Walker et al.

(10) Patent No.: US 7,690,989 B2
(45) Date of Patent: Apr. 6, 2010

(54) SYSTEM AND METHOD FOR AWARDING PRIZES IN A LOCAL EDITION OF AN ONLINE GAME

(75) Inventors: Jay S. Walker, Ridgefield, CT (US); Kurt H. Heinemann, Wilton, CT (US); Jose A. Suarez, Fairfield, CT (US); Daniel E. Tedesco, Huntington, CT (US); Geoffrey M. Gelman, Stamford, CT (US); Stephen C. Tulley, Fairfield, CT (US)

(73) Assignee: Walker Digital, LLC, Stanford, CT (US)

( * ) Notice: Subject to any disclaimer, the term of this patent is extended or adjusted under 35 U.S.C. 154(b) by 1073 days.

(21) Appl. No.: 10/825,535

(22) Filed: Apr. 15, 2004

(65) Prior Publication Data

US 2004/0242332 A1  Dec. 2, 2004

Related U.S. Application Data

(63) Continuation-in-part of application No. 10/822,611, filed on Apr. 12, 2004, now abandoned.

(60) Provisional application No. 60/462,092, filed on Apr. 10, 2003, provisional application No. 60/463,134, filed on Apr. 15, 2003, provisional application No. 60/512,869, filed on Oct. 21, 2003, provisional application No. 60/523,744, filed on Nov. 20, 2003, provisional application No. 60/523,758, filed on Nov. 20, 2003.

(51) Int. Cl.
*A63F 9/24* (2006.01)

(52) U.S. Cl. ................................ 463/25; 463/1; 463/29

(58) Field of Classification Search ................. 463/1, 463/25, 7, 23, 29
See application file for complete search history.

(56) References Cited

U.S. PATENT DOCUMENTS

| 3,852,576 | A | | 12/1974 | Rudd |
| 4,667,336 | A | | 5/1987 | Best |
| 4,745,468 | A | | 5/1988 | Von Kohorn |
| 4,876,592 | A | | 10/1989 | Von Kohorn |
| 5,009,429 | A | * | 4/1991 | Auxier .................... 273/240 |
| 5,022,172 | A | | 6/1991 | Kawahara et al. |

(Continued)

OTHER PUBLICATIONS

"Marketers target regionally; Marketers are now recognising the importance of studying localized buying patterns and are adapting their tactics according to region says Mike Jeanes.", Marketing Week, Jan. 29, 1998, Section: Factfile, pp. 34-35.

(Continued)

*Primary Examiner*—Dmitry Suhol
*Assistant Examiner*—Robert Mosser
(74) *Attorney, Agent, or Firm*—Walker Digital Management, LLC

(57) ABSTRACT

According to some embodiments of the present invention a system and method are provided that allow a player of a game to receive at least one prize. The method may include receiving information about at least one merchant, enabling play of a game by a player, determining merchant information to communicate to the player, and providing at least one prize to the player. In some embodiments, the prizes made available to a player (e.g., for selection) may be based on the location of the player, a merchant, or both.

34 Claims, 13 Drawing Sheets

U.S. PATENT DOCUMENTS

| | | | |
|---|---|---|---|
| 5,083,271 | A | 1/1992 | Thacher et al. |
| 5,259,613 | A | 11/1993 | Marnell, II |
| 5,283,734 | A | 2/1994 | Von Kohorn |
| 5,429,361 | A | 7/1995 | Raven et al. |
| 5,470,079 | A | 11/1995 | LeStrange et al. |
| 5,488,411 | A | 1/1996 | Lewis |
| 5,555,497 | A | 9/1996 | Helbling |
| 5,615,109 | A | 3/1997 | Eder |
| 5,620,182 | A | 4/1997 | Rossides .................. 273/138.2 |
| 5,697,844 | A * | 12/1997 | Von Kohorn ................. 463/40 |
| 5,759,101 | A | 6/1998 | Von Kohorn ................. 463/40 |
| 5,816,918 | A | 10/1998 | Kelly et al. |
| 5,916,024 | A | 6/1999 | Von Kohorn ................. 463/40 |
| 5,933,811 | A | 8/1999 | Angles et al. |
| 5,948,061 | A | 9/1999 | Merriman et al. |
| 6,021,362 | A | 2/2000 | Maggard et al. |
| 6,036,601 | A | 3/2000 | Heckel |
| 6,061,660 | A | 5/2000 | Eggleston et al. ............ 705/14 |
| 6,102,406 | A | 8/2000 | Miles et al. ................. 273/430 |
| 6,119,101 | A | 9/2000 | Peckover |
| 6,183,366 | B1 | 2/2001 | Goldberg et al. |
| 6,185,541 | B1 | 2/2001 | Scroggie et al. .............. 705/14 |
| 6,186,893 | B1 | 2/2001 | Walker et al. |
| 6,249,772 | B1 | 6/2001 | Walker et al. ................. 705/26 |
| 6,267,672 | B1 | 7/2001 | Vance |
| 6,317,718 | B1 | 11/2001 | Fano ............................ 705/1 |
| 6,322,076 | B1 | 11/2001 | Fikki .......................... 273/138 |
| 6,381,582 | B1 | 4/2002 | Walker et al. ................. 705/26 |
| 6,418,421 | B1 | 7/2002 | Hurtado et al. ............... 705/54 |
| 6,453,347 | B1 | 9/2002 | Revashetti et al. .......... 709/224 |
| 6,508,710 | B1 | 1/2003 | Paravia et al. |
| 6,519,571 | B1 | 2/2003 | Guheen et al. ................ 705/14 |
| 6,631,404 | B1 * | 10/2003 | Philyaw ..................... 709/217 |
| 6,636,892 | B1 | 10/2003 | Philyaw |
| 6,645,068 | B1 | 11/2003 | Kelly et al. |
| 6,656,050 | B2 | 12/2003 | Busch et al. |
| 6,712,702 | B2 | 3/2004 | Goldberg et al. |
| 6,928,414 | B1 | 8/2005 | Kim |
| 6,964,608 | B1 | 11/2005 | Koza |
| 6,970,833 | B1 | 11/2005 | Fuchs |
| 7,054,831 | B2 | 5/2006 | Koenig |
| 7,054,839 | B2 | 5/2006 | Eggleston et al. |
| 7,136,871 | B2 | 11/2006 | Ozer et al. |
| 2001/0039210 | A1 | 11/2001 | St. Denis |
| 2002/0022516 | A1 | 2/2002 | Forden |
| 2002/0065757 | A1 | 5/2002 | Lam ............................ 705/37 |
| 2002/0077169 | A1 | 6/2002 | Kelly et al. |
| 2002/0103022 | A1 * | 8/2002 | Somol et al. .................. 463/25 |
| 2002/0128908 | A1 | 9/2002 | Levin et al. |
| 2002/0143619 | A1 | 10/2002 | Laurie ......................... 705/14 |
| 2003/0032476 | A1 | 2/2003 | Walker et al. |
| 2003/0039210 | A1 | 2/2003 | Walker et al. |
| 2004/0009815 | A1 | 1/2004 | Zotto et al. |
| 2004/0148221 | A1 | 7/2004 | Chu |
| 2004/0204247 | A1 | 10/2004 | Walker et al. |
| 2004/0242332 | A1 | 12/2004 | Walker et al. |
| 2006/0128469 | A1 | 6/2006 | Willis et al. |

OTHER PUBLICATIONS

Website: "Ohio retailer rescues Filene's Basement", (http //www epicuredigital com/pdfs/history pdf), Eagle-Tribune Publishing, Feb. 4, 2000.

Komando, Kim, "Power Shopping on the Internet", USA Today, Oct. 29, 2001, (http //www usatoday com/tech/columnist/2001/10/29/komando htm).

Press Release: "KPBS Presents Online Knowledge Challenge Jan. 21-25, San Diego's KPBS is the first public broadcasting affiliate in the nation to launch new, interactive fund raising innovation.", Kintera, Jan. 14, 2002, (http www kintera com/home/press/2002/kintera_050 asp).

Daniels, Malcomb, "City Awaits Court Ruling on Legality of Adult Arcades", Birmingham News, Jan. 16, 2002, Section: Neighborhoods.

O'Brien, Julie, "Spend some hazy, lazy days reading this summer; Neighbor", Daily Herald, May 29, 2002, Section: p. 3.

Website: "Flibid.com—Flipping the Rules! Flibid.com Free Reverse Auction Site for Buyers and Sellers", (http //www epicuredigital com/pdfs/history pdf), Copyright 2003.

Press Release: "Baseview and Tribune Interactive Partner to Provide UPICKEM Sports Games on Seven Newspaper Web Sites", Tribune Company, Jan. 16, 2003, (http //www tribune com/pressroom/relaseses/2003/01162003 html).

"Bonita Springs", The News-Press (Fort Myers, FL), Feb. 3, 2003, Section: South Lee Bonita, p. 2H.

"Retailing's top dogs are tough to beat", The Grocer, Feb. 15, 2003, Section: Analysis, p. 40.

Website: "coolsavings.com inc: Press Room: In The News", (http //info coolsavingscom/news/faqs asp?tabs=faqs&nav=faqs &CS=http%3A%2F%2Fw..), download date: Mar. 27, 2003.

Website: "Help & Service—About Express In-store Pickup", (http www circuitcity com/cs_contentdisplay jsp?BV_EngineID=ccedadchlkjkjkjghcfngck... , download date: Mar. 27, 2003.

Website: "Free Money Saving Local and National Coupons—Coupons-Coupons.com", (http //www myclipper com/), download date Apr. 1, 2003.

Website: "Online Coupons, Free Stuff, Discount Shopping Deals with local bay area merchants.", (http //www peninsulaonline com/), download date: Apr. 1, 2003.

Website: "Print your own Local Discounts at fasTour.com—The Listing the Locals Use! —Newport, ....", fasTour.com, (http fasTour com/coupons html), download date: Apr. 1, 2003.

Turcsik, Richard, "Recycling-slot machine is tested at A&P unit.", Supermarket News, Dec. 21, 1992, Section: vol. 42, No. 51, 2 pp.

Poe, Janita, "Promoters confident TV viewers eager to cry 'Bingo!'", Chicago Tribune, May 7, 1992, Section: Chicagoland, 2 pp.

Gillen, Marilyn A., "Ads Begin To Pop Up In CD-ROMs, Games; Ads begin in video & games and CD-ROM", Billboard, Mar. 25, 1995, 3 pp.

Rich, Laura, "All aboard the brand train: Gannett is confident national advertisers will take a ride on its NYC subway program", Inside Media, Mar. 29, 1995, 3 pp.

"DCI Telecommunications Inc. Announces Merger Discussion", PR Newswire, Mar. 15, 1996, Section: Financial News, 2 pp.

Australian Interactive Television Could Include Gambling on Demand, Computergram International, May 2, 1996, 2 pp.

Hilzenrath, David S., "Change Is Good, They Bet; CyberCash Has the Product. Now if Only Nickel-and-Dime Transactions Would Take Off" The Washington Post, Oct. 21, 1996, Section: Financial, 6 pp.

"Discounts, Without Strings (Or Wires)", Wireless Week, Apr. 24, 2000, Section: Paging/Messaging, 1 pg.

Slavick, Frank, "Eyes North", Billing World, May 2000, 7 pp.

Baard, Erik, "Here and Now", Chief Executive (U.S.), Aug. 1, 2000, 7 pp.

"A one-stop-shop for credit", Cards International, Aug. 21, 2000, 3 pp.

Website: "Partner Sites—Best-Credit-Deals.com", (http //www best-credit-card-deals com/links_6 html), download date: Nov. 8, 2002, 4 pp.

Website: "Yahoo! Games—Welcome, Guest Yahoo! Games", (http //games yahoo com/), download date: Nov. 8, 2002, 2 pp.

Website: "Yahoo! Games- Chess", (http //games yahoo com/games/login2?page=ch), download date: Nov. 8, 2002, 2 pp.

Website: "Yahoo! Help—Games—How do I start playing?", (http //help yahoo com/help/us/games/games-12 html), download date: Nov. 8, 2002, 1 pg.

Website: "Yahoo! Help—Games—Top 5 Questions", (http //help yahoo com/help/us/games/), download date: Nov. 8, 2002, 2 pp.

Website: "Yahoo! Loan Center", (http //loans yahoo com/), download date: Nov. 8, 2002, 1 pg.

Website "The Yahoo! Titanium Visa® Card", download date: Nov. 8, 2002, 1 pg.

Tedesco, Richard "Pactel pushed 'Net access." Broadcasting & Cable, Jun. 3, 1996, 2 pp.

Colman, Price "Cross-marketing cuts cable bills." Broadcasting & Cable, Jul. 15, 1996, 3 pp.

Fleming et al. "European Banks, Insurance Firms Cross Into Each Other's Territory." Wall Street Journal. (Europe) Feb. 20, 1991, 4 pp.

"Examiner's Affidavit", Affidavit of USPTO Examiner James W. Myhre, dated Apr. 11, 2003, 1 pg.

"Examiner's Affidavit", Affidavit of USPTO Examiner James W. Myhre, dated Dec. 22, 2003, 1 pg.

Office Action dated Jul. 16, 2007 U.S. Appl. No. 10/908,853, filed May 27, 2005, 10 pp.

Office Action dated Jul. 10, 2007, U.S. Appl. No. 10/822,611, filed Apr. 12, 2004, 15 pp.

Office Action dated Jan. 31, 2008, U.S. Appl. No. 10/822,611, 12 pp.

Office Action dated Sep. 17, 2008, U.S. Appl. No. 10/908,853, 12 pp.

Office Action dated Feb. 2, 2009, U.S. Appl. No. 10/908,853, 12 pp.

Office Action dated Oct. 6, 2008, U.S. Appl. No. 10/267,651, 11 pp.

\* cited by examiner

| PLAYER IDENTIFIER 402 | NAME 404 | FINANCIAL ACCOUNT IDENTIFIER 406 | ADDRESS 408 | EMAIL ADDRESS 410 | DEMOGRAPHIC INFORMATION 412 | GEOGRAPHIC PREFERENCE 414 |
|---|---|---|---|---|---|---|
| P-568249 | BOB SMITH | ACCT 99 003 | 27 DEVON AVE. SMALLVILLE, CT 99699 | SMITHB@ SITE.ORG | MARRIED | STAMFORD, CT |
| P-568250 | JIM RED | 5424 5555 8910 3218 VISA - 03/2005 | 14 SMITH LANE BIGTON, CT 99690 | BIGRED@ CT.COM | 2 CHILDREN | BIGTON, CT |
| P-568245 | JOE GREEN | 99 818 5555 | (203) 555-2123 | JGREEN@ WEB.COM | HIKER, CYCLIST | STAMFORD, CT |

| MERCHANT IDENTIFIER 502 | MERCHANT NAME 504 | ADDRESS 506 | GEOGRAPHIC INFORMATION 508 | CATEGORY 510 | DESCRIPTION 512 |
|---|---|---|---|---|---|
| M-28001 | MARIO'S PIZZA | 43 RICH AVE. DARIEN, CT 99699 | FAIRFIELD COUNTY | RESTAURANT | "DINNER MENU: CHICKEN CUTLET $6.95..." |
| M-28002 | LUIGI'S PIZZA | 11 JONES ST. STAMFORD, CT 99690 | STAMFORD; DARIEN | RESTAURANT; TAKE-OUT | "GREAT FOOD AT GREAT PRICES" |
| M-28003 | SUPER-CLEAN CAR WASH | (203) 555-2998 | BIGTON; STAMFORD | AUTOMOTIVE SERVICES | "SINCE 1987" |

| PRIZE IDENTIFIER 602 | MERCHANT IDENTIFIER 604 | DESCRIPTION 606 | PRIZE CATEGORY 608 | NUMBER OF UNITS AVAILABLE 610 | CONDITIONS 612 |
|---|---|---|---|---|---|
| MP-MCP-001 | M-28001 | 12 INCH CHEESE PIZZA | DINNER ENTREE | 74 | MON-FRI 8PM-10PM |
| LP-MCP-001 | M-28002 | 12 INCH CHEESE PIZZA | DINNER ENTREE | 37 | N/A |
| SC-MCP-002 | M-28003 | REGULAR WASH | CAR WASH | 42 | TUESDAY ONLY |

| ISSUED PRIZE IDENTIFIER 702 | PLAYER IDENTIFIER 704 | DATE ISSUED 706 | EXPIRATION DATE 708 | REDEMPTION DATE 710 |
|---|---|---|---|---|
| MP-MCP-001-01 | P-892133 | OCT 15, 2003 15:40 | NOV 15, 2003 | N/A |
| MP-MCP-001-02 | P-446581 | OCT 15, 2003 15:41 | NOV 01, 2003 | N/A |
| MP-MCP-001-03 | P-616800 | OCT 15, 2003 15:45 | NOV 15, 2003 | N/A |
| SC-MCP-002-01 | P-892133 | OCT 15, 2003 15:40 | N/A | OCT 21, 2003 |
| SC-MCP-002-02 | P-971234 | OCT 15, 2003 16:04 | NOV 08, 2003 | NOV 01, 2003 |

| RULE IDENTIFIER 802 | PRESENTATION RULE DESCRIPTION 804 | SUBJECT 806 |
|---|---|---|
| PR-01 | DO NOT SHOW ANY PRIZES FROM <MERCHANT> IF PLAYER LIVES IN BIGTON, CT | M-28001; M-28002 |
| PR-02 | PRESENT TWICE THE NUMBER OF OFFERS IF PLAYER HAS MORE THAN THREE CHILDREN | N/A |
| PR-03 | DO NOT PRESENT ANY <CATEGORY> PRIZES IF PLAYER ACCEPTED <CATEGORY> PRIZE IN SAME WEEK | FOOD; HAIRCUT |
| PR-04 | SHOW ALL PRIZES FROM <MERCHANT> IF PLAYER SELECTS BIGTON, CT EDITION | M-28003 |
| PR-05 | ALWAYS INCLUDE GAME QUESTION ABOUT <MERCHANT> UNTIL 03/25/05 | M-28007 |
| PR-06 | INCLUDE BANNER AD FOR <MERCHANT> ON GAME SCREEN | M-28037 |

FIG. 8

SYSTEM AND METHOD FOR AWARDING PRIZES IN A LOCAL EDITION OF AN ONLINE GAME

The present application claims the benefit of priority of:
a) U.S. Provisional Patent Application No. 60/463,134 filed Apr. 15, 2003, entitled "SYSTEM AND METHOD FOR AWARDING RETAIL ENTITLEMENTS THROUGH AN ONLINE GAME," in the name of Walker et al.;
b) U.S. Provisional Patent Application No. 60/512,869 filed Oct. 21, 2003, entitled "APPARATUS, SYSTEMS AND METHODS FOR TRACKING THE REDEMPTION OF PROMOTIONAL OFFERS," in the name of Walker et al.;
c) U.S. Provisional Patent Application No. 60/523,744 filed Nov. 20, 2003, entitled "APPARATUS, SYSTEMS AND METHODS FOR PROVIDING INFORMATION TO MERCHANTS," in the name of Walker et al.; and
d) U.S. Provisional Patent Application No. 60/523,758 filed Nov. 20, 2003, entitled "APPARATUS, SYSTEMS AND METHODS FOR TRACKING THE REDEMPTION OF PROMOTIONAL OFFERS," in the name of Walker et al;

and the present application also is a continuation-in-part of U.S. patent application Ser. No. 10/822,611 filed Apr. 12, 2004, entitled "SYSTEM AND METHOD FOR PROVIDING PRODUCTS TO GAME PLAYERS" now abandoned; which claims the benefit of priority of U.S. Provisional Patent Application No. 60/462,092 filed Apr. 10, 2003. The entirety of each of the above applications is incorporated by reference herein for all purposes.

This application is also related to U.S. patent application Ser. No. 10/908,853 filed May 27, 2005, entitled "SYSTEM AND METHOD FOR PRESENTING PRIZES IN A GAME."

This application is also related to U.S. patent application Ser. No. 10/267,651 filed Oct. 8, 2002, entitled "METHODS AND APPARATUS FOR FACILITATING THE PROVISION OF A BENEFIT TO A PLAYER OF A GAMING WEB SITE."

BACKGROUND

Attracting and retaining a base of local customers is important to the success of most retail endeavors. Historically, many retailers have tried to attract local customers through advertising and promotions. However, advertising costs are on the rise, and many commentators argue that advertising is steadily becoming less effective. Further, promotional vehicles such as coupons are declining in effectiveness. Accordingly, an ongoing need exists among retailers for systems and methods designed to facilitate the acquisition of local customers.

BRIEF DESCRIPTION OF THE FIGURES

The accompanying drawings depict some exemplary embodiments of the present invention:

FIG. 4 is a table illustrating an example data structure of a player database for use in some embodiments of the present invention;

FIG. 5 is a table illustrating an example data structure of a merchant database for use in some embodiments of the present invention;

FIG. 6 is a table illustrating an example data structure of a prize database for use in some embodiments of the present invention;

FIG. 7 is a table illustrating an example data structure of an issued prize database for use in some embodiments of the present invention;

FIG. 8 is a table illustrating an example data structure of a presentation rules database for use in some embodiments of the present invention;

DETAILED DESCRIPTION

Figure 1:
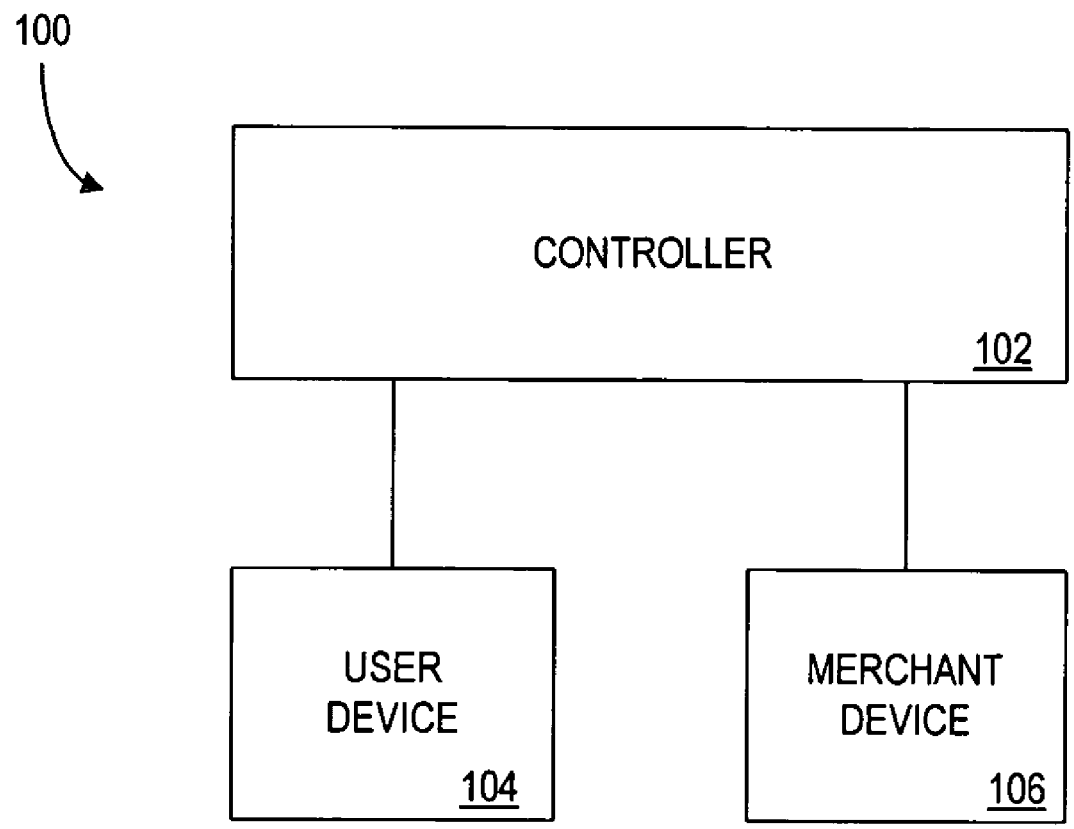
FIG. 1 is a diagram illustrating an example system according to some embodiments of the present invention.

Applicants have recognized that some types of game players and consumers would find it appealing to play a game that is configured, at least in part, based on geographic data. According to some embodiments of the present invention, one or more elements of a game may be configured based on geographic data associated with a player. For example, based on a player's selection or indication of a particular geographic location, one or more game elements (e.g., subject matter of game questions, theme elements, graphics, audio, prizes) may be determined and used to provide a "local edition" of a game to the player.

Applicants have further recognized that some types of game players and consumers may find it appealing to play for prizes that are relevant to their geographic area. Some embodiments allow for an entity (e.g., a game server, a prize server) to identify one or more available prizes based on geographic data associated with the player. For example, based on a player's success in playing a game, the player may be allowed to select (and/or may be awarded) a prize that is based on geographic data provided by the player (e.g., a selection of a particular "local edition" of a game, a residential address, a ZIP code).

According to some embodiments of the present invention, a prize may comprise an entitlement (e.g., to a retail product or service). In other embodiments, a prize for play of a game may be the opportunity to obtain at least one entitlement. For example, a player of a game may be permitted to receive at least one entitlement to a product or service based on the player's play of the game.

In at least one embodiment of the present invention, a player can earn (e.g., based on game performance) the ability to purchase one or more entitlements. According to some embodiments, the amount required to purchase an entitlement may be based on the player's performance in a game.

Applicants have also recognized that some types of retailers may find it appealing to take advantage of new systems and methods useful in facilitating the acquisition of local customers. One or more embodiments of the present invention provide for systems and methods that advantageously allow for a retailer to submit marketing information (e.g., information about a retailer, information about products and/or offers available from a retailer) to a central controller that will distribute such information to system users. Some embodiments of the present invention provide for systems and methods that advantageously allow for a retailer to sponsor one or more various types of prizes and/or allow a central entity to distribute such prizes, which may include entitlements redeemable at retail merchants. In at least one embodiment, such a distribution may be managed in a centralized, online system (e.g., through presentation of an online game).

Applicants have further recognized that some merchants may find it appealing, in accordance with some embodiments of the present invention, to be able to promote goods and services to prospective customers from predefined geographical regions by awarding entitlements through online games. In one or more embodiments, promotional entitlements may be based on geographic data associated with such prospective customers.

Various embodiments of the present invention allow for an entity (e.g., a central server) to distribute to users entitlements redeemable at retail merchants. Some embodiments allow for an entity to manage play of an online game that awards entitlements as prizes (e.g., based on game performance) to geographically relevant players. According to some embodiments, elements in the online game may be configured based on geographic data associated with a prospective customer. For example, based on a prospective customer's selection of a geographic location, products from local retailers are selected from a database and used to provide a "local edition" of a game (e.g., a pricing-themed game). Alternatively or additionally, based on geographic data associated with a prospective customer, an online game may be configured to award certain geographically relevant prizes (e.g., entitlements to products marketed by local retailers).

Applicants have also recognized that some types of retailers would find it appealing, in accordance with some embodiments of the present invention, to utilize an entertaining way to (a) distribute promotional entitlements to geographically relevant prospective customers, and/or (b) educate prospective customers about goods and services offered by local retail merchants. For example, some types of retailers would find it appealing to use an online game system to motivate players of the game (prospective customers) into becoming customers. Similarly, prospective customers would find it appealing to be able to receive promotional entitlements and/or information about local products and services in an entertaining way.

In some embodiments, merchants may be able to attract new customers by providing products or services at sub-retail prices. Users may, in turn, obtain products at steep discounts while enjoying an entertaining game experience.

In some embodiments, a controller may sell game plays to users and/or receive payments from users based on a gap between a price level provided to a user (e.g., through play of a game) and a target price. Preferably, the gap or payment amount is greater than the price that the controller paid (if any) to obtain a corresponding entitlement (e.g., a product guarantee).

Some embodiments of the present invention provide the benefit that a controller does not need to handle actual products. For example, while the controller may maintain information about what products are available at participating merchants, the controller need not itself take possession of actual merchandise.

According to some embodiments of the present invention, a merchant (or third party) sells or otherwise provides a retail entitlement to a controller. The controller sells to a user a means for obtaining a product or service associated with the entitlement, and the user obtains the product or service from the merchant.

Various embodiments of the present invention are described herein with reference to the accompanying drawings. The leftmost digit(s) of a reference numeral typically identifies the figure in which the reference numeral first appears.

As will be understood by those skilled in the art, the drawings and accompanying descriptions presented herein are exemplary configurations and arrangements for stored representations of information. A number of other configurations and arrangements may be employed besides those shown. For example, the illustrated entries represent exemplary information, but those skilled in the art will understand that the number and content of the entries can be different from those illustrated herein.

A. Introductory Examples

The following scenarios describe exemplary embodiments in which a player may obtain one or more retail entitlements as a prize. The examples are provided merely as a brief introduction and to illustrate some aspects and features of the present invention, and should not be construed as limiting the scope of the invention in any way. Various other embodiments and examples of embodiments are discussed in further detail herein, and others will be apparent to those skilled in the art in light of the present disclosure.

In one example of a "Prize Meter" embodiment, a pricing-themed game is configured based on a prospective customer's selection of a geographic region. More specifically, based on the prospective customer's selection of a geographic region, the controller consults a database and configures a "showcase" of products available at retail merchants within the geographic region. The controller then initiates a pricing-themed game whereby prospective customers are asked a series of price-oriented questions about the showcased products. Throughout the game (e.g., after each question and answer), the controller communicates the prospective customer's success in answering the questions by adjusting a "Prize Meter" that represents an amount of credit the player has won toward the purchase of at least one product in the showcase. At the end of the game, the prospective customer may elect to pay the difference between the final Prize Meter amount and a target price. For example, a target price may be based on an average of the retail prices of products in a given group (e.g., a showcase of products). Payment of this difference to the controller would allow the customer to redeem at least one showcased product from a retailer within the selected geographical region. In some Prize Meter embodiments, the difference between a Prize Meter amount and a target price may be referred to as a Prize Meter Gap Amount. Further, in some Prize Meter embodiments, players must pay the controller an amount based on the Prize Meter Gap Amount in order to receive retail entitlements.

According to another example of a Prize Meter embodiment, Sue Johnson, a consumer from Stamford, Conn., uses her personal computer to log onto www.GameShow24.com, a website configured to host a pricing-themed game based on the television show "The Price is Right™." Upon first entering the website, the controller that hosts the website prompts Sue to enter her name and verify that she is at least eighteen years old. After Sue enters her name and verifies her age, the controller prompts Sue to select an area-specific edition of the game from a plurality of listed possibilities, including, for example "New Canaan, Conn.," "Weston, Conn." and "Stamford, Conn."

After Sue selects the "Stamford, Conn." option, a "greeting screen" is presented to Sue. The greeting screen depicts a game show host character and includes a message that reads, "Nice to have you here, Sue Johnson. I'm the host of the show, Bill. Here's how we play." The greeting screen is followed by a series of instructional screens, which explain to Sue: (1) "You'll be asked four questions about the retail prices of selected items from Stamford merchants"; (2) "After each question, you'll see your 'Prize Meter.' The better you play, the higher it gets, and the more credit you win towards the purchase of items from Stamford merchants"; and (3) "After four questions, the show ends. Then, you'll pick your items from the 24 prizes that appeared on the show. And, first time players get prizes absolutely free. So let's play!"

Based on Sue's selection of the "Stamford, Conn." option, the controller retrieves, from a database, game elements corresponding to a "Stamford edition" of the game. More specifically, icons representing products offered at merchants within the Stamford area are retrieved from a database and communicated to Sue in a "showcase" of products. Other graphics and text presented in the game communicate information about a plurality of local merchants (e.g., a merchant's location and business hours).

The game begins as the controller provides Sue with her first question. More specifically, the game show host character is represented as saying, "Here is your first question. Which 4 items from Stamford-area merchants have a retail price more than $4.00?" The controller also provides images of six products for sale at Stamford merchants. After Sue selects four of the six products in response to the question (e.g., by checking corresponding boxes using a mouse or other pointer device), the controller consults a database to determine Sue's success in answering the question. For example, the controller may determine that Sue selected only three of the four correct items, and may output a screen reading, "Not bad. You got 3 out of 4 right."

After this first round of the game is completed, the controller adjusts Sue's Prize Meter, which will ultimately represent the amount of credit Sue has won toward the purchase of at least one product from a participating merchant in the Stamford area. More specifically, based on Sue's degree of accuracy/correctness in answering the question, the Prize Meter is increased. For example, Sue's original Prize Meter amount of $0 may be increased to $1.50 based on Sue's selecting three of four correct answers in the first round of the game. The adjusted price is output to Sue along with a message that reads, "That's a good start. You're on your way to some great prizes."

Similarly, three more rounds ensue, asking Sue price-oriented questions about products available at participating Stamford-area merchants. After each round, based on Sue's degree of accuracy/correctness, the Prize Meter is increased further.

After the last (fourth) round, the final Prize Meter amount is calculated and displayed to Sue. The controller consults a database to determine the number of products toward which Sue may apply her Prize Meter credit (e.g., two items). Further, the controller outputs an instructional message explaining that, generally, players would pay the difference between the final Prize Meter amount and a target price (e.g., the average retail price of the items in the showcase), and thereby receive vouchers good for one or more selected showcase products. However, the controller recognizes Sue as a first-time player, and awards a credit equal to the difference between the final Prize Meter amount and the target price. Thereafter, Sue (1) selects a predetermined number of prizes in the showcase (e.g., two items), and (2) provides identification data, such as full name, address, and credit card number. After selecting her items in the showcase, Sue is permitted to download and print vouchers that indicate her entitlement to the corresponding goods and/or services offered at Stamford merchants.

According to one example of a "Price Tag" embodiment, a pricing-themed game is configured based on a prospective customer's selection of a geographic region. Based on the prospective customer's success in answering price-oriented questions about products sold by merchants within the selected geographic region, a Price Tag is adjusted. At the end of the game, the prospective customer may elect to pay the Price Tag amount. Payment of the Price Tag amount to the controller would provide the customer the right to redeem at least one product from a retailer within the selected geographic region.

According to another example of a "Price Tag" embodiment, Bob Smith, a consumer from Stamford, Conn., uses his personal computer to log onto www.GameShow24.com, a website configured to host a pricing-themed game based on the television show "The Price is Right™." Upon first entering the website, the controller which hosts the website prompts Bob to enter his name and verify that he is at least eighteen years old. After Bob enters his name and verifies his age, the controller prompts Bob to select an area-specific edition of the game from a plurality of listed possibilities, including, for example "New Canaan, Conn.," "Weston, Conn." and "Stamford, Conn."

After Bob selects the "Stamford, Conn." option, a "greeting screen" is provided to Bob, in a manner similar to that described above with respect to the Prize Meter example. The game begins as the controller provides Bob with his first question. More specifically, a game show host character is illustrated to state, "Here is your first question. Which 4 items from Stamford-area merchants have a retail price more than $4.00?" The controller simultaneously provides images of six products for sale at Stamford merchants. After Bob selects four of the six products in response to the question, the controller consults a database to determine Bob's success in answering the question. For example, the controller may determine that Bob selected only three of the four correct items, and may output a screen reading "Not bad. You got 3 out of 4 right."

Further, according to this example, the controller outputs a screen to educate Bob about the correct answer, so that Bob learns about the local merchants' products and prices. For example, the controller may output a screen reading, "Here is the 1 you missed." Simultaneously, the controller may also highlight or otherwise indicate the corresponding item, in this case the last remaining item from a Stamford-area merchant that has a retail price of more than $4.00. Additionally, the controller may output a screen that reveals the actual retail prices charged by the Stamford-area merchants for all of the six items displayed in the first round of the game. For example, a screen may be provided to Bob that (1) reads "By the way, in the Stamford-area the actual retail prices of the first six items are . . . "; and (2) reveals the actual retail prices for the corresponding items. Thus, the game would educate Bob about the actual retail prices associated with the items used as game elements.

After this first round of the game is completed, the controller adjusts Bob's "Price Tag," which will ultimately be used to determine the price at which Bob may purchase at least one product from a participating Stamford-area merchant. More specifically, based on Bob's degree of accuracy/correctness in answering the question, the Price Tag would be adjusted downward. For example, Bob's original Price Tag of $4.44 may be decreased to $3.92 based on Bob's selecting three of four correct answers in the first round of the game. The adjusted price may be output to Bob along with a message that reads, "That's a good start. You're on your way to some great prizes."

Similarly, three more rounds ensue, asking Bob price-oriented questions about products available at participating Stamford-area merchants. After each round, based on Bob's degree of accuracy, the Price Tag is adjusted further downward.

After the last (fourth) round, the final Price Tag amount is calculated and displayed to Bob at his computer. The controller consults a database to determine how many prizes Bob could select. In this example, a prize would be the ability to purchase one or more of the previously displayed products at the amount indicated by the final Price Tag. Once it is determined how many products Bob may purchase at the final Price Tag value, Bob is given the ability to select products from the twenty-four previously displayed products.

However, first-time players such as Bob may be issued a credit that enables them to redeem products entirely for free. In such cases, first-time players such as Bob may be required to (1) select the products they wish to redeem at the corresponding local merchants, and (2) provide identification data, such as full name, address, and credit card number. On the other hand, returning players may be required only to select the products they wish to purchase for the final Price Tag amount, which may be charged to their credit card account, for example. Vouchers may be downloaded and printed that indicate entitlement to the corresponding goods and/or services offered at participating merchants.

B. Terms and Example Meanings

Throughout this disclosure and unless otherwise indicated, the following terms may include and/or encompass example meanings described herein. Of course, other meanings encompassed by such terms may be understood by those of ordinary skill in the art in light of the disclosure.

Central computer, controller, central controller, server: An electronic device (e.g., a computer) that preferably is configured to communicate with one or more other devices, such as a user device and/or a merchant device. In one example, a central controller may be configured to communicate with one or more merchant devices so that promotion data can be uploaded, accessed, updated, and the like. In another example, a central controller may be configured to distribute promotional information about merchants (e.g., product information) and/or to distribute prizes (e.g., sponsored by local retailers). In another example, a central controller may be configured to write to and read from local and/or remote databases that store data concerning retailers, customers, games, and the like. In another example, a central controller may be configured to host one or more websites (e.g., a game-themed website that allows remote users to play games and potentially win retail entitlements).

Player, user, customer, prospective customer: A person who communicates with a controller using a game device or other type of user device. For example, a user may participate in one or more online games that potentially award retail entitlements.

Game element: A feature or aspect of a game. Game elements may include, but are not limited to, (a) visual images of products for sale at retail merchants, (b) visual images of products that may be awarded through an online game, (c) prices of products for sale at retail merchants, (d) visual images of geographic areas or landmarks therein, (e) geographic location information, and (f) information associated with a retailer.

Geographic location, geographic position, position data, location data: A data element that includes an indication of a location of a particular party or entity (e.g., a consumer, a retailer). Geographic location data may indicate, for example, a user's residence, a user's contact information, a merchant's place of business, and/or a user's current location. Such information may include, but is not limited to, a street address and/or ZIP code, global positioning system (GPS) coordinates, Internet Protocol address, and the like. In one embodiment, geographic location data may comprise or be included in a signal transmitted by a user (e.g., to a central computer). In one example, such a signal may indicate a customer's selection of a geographic area and/or a version or edition of an online game (e.g., the version is associated with at least one particular geographic area).

Geographic region: A geographic area that may be useful in determining the relative positions of system participants (e.g., customers, retailers). Preferably, a geographic region includes more than one geographic location. Retailers and/or the operators of a central server may define geographic region data. In one example, geographic region data may be stored in a database (e.g., accessible by a central controller).

Geographic data: Data that includes any type of information related to location, such as geographic region data and/or location data.

Local customer, local prospective customer, prospective local customer: A user who is associated with a geographic region associated with a particular retailer.

Non-local customer, non-local prospective customer, prospective non-local customer: A consumer who is not associated with a geographic region associated with a particular retailer.

Retailer, retail merchant, participating retailer, merchant, participating merchant: A seller of goods and/or services. Preferably, a merchant registers with the operator of a central controller to provide retail entitlements to prospective customers (e.g., through a website or other distribution means).

Prize, award: In some embodiments a prize or award refers to a good, service or other benefit (e.g., an offer, an entitlement) indicated or sponsored by a merchant. In one example, an award may be supplied by a merchant to a central controller (e.g., prize server, game server) for distribution to players of a game. In some embodiments, a prize or award may refer to the granting of access to or the determining that a player is eligible to receive, purchase or otherwise obtain an entitlement. For example, a player of a game may be awarded with the ability to select from one or more presented offers. Alternatively, or in addition, a prize may refer to a good, service or other benefit (e.g., an offer, an entitlement) provided or distributed to a user. For example, an award may include a voucher or other representation of a user's entitlement to a product, or, in some embodiments, may refer to the product itself. In one example, a prize is provided to a player participating in an online game. In another example, game contestants may select as prizes (e.g., from an inventory of available prizes or "prize showcase") one or more benefits and "claim" or "accept" them (e.g., by printing out a "prize claim ticket") after successfully completing a game session (or portion thereof). In some embodiments, a particular merchant may provide more than one offer to a system (e.g., a first offer is a meatball sandwich and a second offer is a dessert).

Retail entitlement, entitlement: In some embodiments, an entitlement includes the right to receive a particular product or service from a retailer (e.g., by presenting a certificate to the retailer). In other embodiments, an entitlement may include the right to purchase a product or receive a service from a retailer at a discounted price. In some embodiments, retail entitlements are awarded as prizes through online games (e.g., based on a player's play of a game). Some types of entitlements may be represented by vouchers and/or prize codes. In some embodiments, an entitlement may include a product guarantee, which is a promise—(e.g., by a merchant) to provide a product or service when one or more conditions are satisfied. In some embodiments, an entitlement may include or be associated with an offer for a product or service. For example, a retail entitlement may correspond to an offer supplied to a central controller by a merchant (e.g., an offer for a product).

Price tag: In accordance with some embodiments, a price tag includes a graphical representation of a price that may decrease based on the performance of a player in a game (e.g., based on the degree to which a player has answered at least one game question correctly). In one example that features a pricing-themed game, a price tag price decreases based on the number of price-oriented questions the player has answered correctly. In some embodiments, the value or price associated with a price tag (e.g., a final or ultimate price tag) may be used as the basis for determining the price of one or more retail entitlements.

Prize meter, price meter: In accordance with some embodiments, a prize meter includes a graphical representation of an amount or value that may increase based on the performance of a player in a game (e.g., based on the degree to which a player has answered at least one game question correctly) and/or based on various other factors. In one example, a pricing-themed game, the amount indicated by a prize meter increases based on the number of price-oriented questions the player has answered correctly. In some embodiments, the value or amount associated with a prize meter (e.g., a final or ultimate prize meter) may be used as the basis for determining the price of one or more retail entitlements. In some embodiments, the prize meter amount is a credit amount that may be applied toward the purchase of an entitlement.

Gap amount: In some embodiments, a gap amount describes a difference between a value, price, or amount (e.g., one that is associated with a player's performance in a game) and a target price that is associated with one or more entitlements. In one example, the gap amount is the difference between (a) an amount (e.g., a credit amount indicated by a prize meter) earned by or awarded to a user (e.g., by playing a game), and (b) a target price that is based on an average of the retail prices of products in a given group (e.g., a showcase of products). In some embodiments, in order to receive one or more retail entitlements, a player must pay the central controller an amount that is based on the gap amount.

Player device, user device, customer device: An electronic device (e.g., a computer, Personal Digital Assistant, cell phone, kiosk, etc.) configured to be in communication with a central controller (e.g., over a communications network). In some embodiments, a user device may comprise a game device configured or configurable to provide for play of a game by the user. In some embodiments, a game device may comprise a computer in communication over the Internet with a game server to provide for play of an online game.

Product: As used in this disclosure, a product may be used to refer to any good, item, merchandise or service offered by or available through a retailer. In some embodiments, products (or entitlements to products) are offered as prizes by a central controller. In some embodiments, purchasing a product may include purchasing an entitlement to that product.

Voucher, prize code: Preferably, a voucher or a prize code is a representation or indication of a retail entitlement. In one example, a voucher is an evidentiary manifestation of a retail entitlement and is made available to a customer who participates in an online game. Vouchers or prize codes may be provided to customers in printed form (e.g., through the mail) and/or electronically (e.g., downloaded to a personal computer or a Personal Digital Assistant). In some embodiments, a customer presents a voucher or prize code to a retail merchant. In some embodiments, a merchant may confirm the validity of a voucher or prize code received from a customer and might also provide the customer with a good or service.

C. System

An example embodiment of the system 100 of the present invention is depicted in FIG. 1. The present invention can be configured to work as a system 100 in a network environment including a controller 102 (e.g., a computer-based server) that is in communication, via a communications network, with one or more user devices 104 (e.g., personal computer) and/or merchant devices 106 (e.g., POS terminals, personal computer, validator device). The controller 102 may communicate with the devices directly or indirectly, via a wired or wireless medium such as the Internet, LAN, WAN or Ethernet, Token Ring, or via any appropriate communications means or combination of communications means. Each of the devices 104, 106 may comprise computers, such as those based on the Intel® Pentium® processor, that are adapted to communicate with the controller 102. Any number and type of devices 104, 106 may be in communication with the controller 102.

Communication between the devices 104, 106 and the controller 102, and among the devices 104, 106, may be direct or indirect, such as over the Internet through a website maintained by computer on a remote server or over an online data network including commercial online service providers, bulletin board systems and the like. In yet other embodiments, the devices 104, 106 may communicate with one another and/or the controller 102 over RF, cable TV, satellite links and the like.

Some, but not all, possible communication networks that may comprise the network or be otherwise part of the system 100 include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In another example, a user may download game data from the controller 102 into a PDA, and may play a game several weeks later. The PDA might be programmed, for example, to reveal prize codes only when the user has answered a threshold number of questions correctly.

As described in further detail herein, the controller 102 (e.g., a game server, offer server) is operable to manage and/or optimize the distribution and display of game, offer, product, and/or merchant information. For example, the controller 102 may manage the communication of merchant-related information to potential customers (e.g., users playing one or more online games). In various embodiments, the controller 102 (or, in an alternative embodiment, a peer-to-peer network) can control, for example, whether an entitlement will be provided at a given time, whether a user should be allowed to play a game, and/or determine what types of merchants and/or offers should be presented to a user (e.g., in a game, in a showcase of prizes). In one or more embodiments, the controller 102 may manage what type of content should be included in a game and/or determine what version of a game to provide to a player.

In some embodiments, the controller 102 may function as a "web server" that generates webpages (documents on the World Wide Web that typically include an HTML file and associated graphics and script files) that may be accessed via the World Wide Web and allows communication with the controller 102 in a manner known in the art. In some embodiments, the controller 102 may function as a server for providing online game play (e.g., via the Internet, via an intranet).

Any or all of the devices 102, 104, 106 may be, e.g., conventional personal computers, portable types of computers, such as a laptop computer, a palm-top computer, a hand-held computer, or a Personal Digital Assistant (PDA), or they may be specialized devices built for specific purposes such as publicly-available terminals or kiosks.

In some embodiments, a controller 102 may not be necessary and/or may not be preferred. For example, the present invention may, in one or more embodiments, be practiced on a stand-alone user device 104. In such embodiments, any functions described as performed by the controller 102 or data described as stored on the controller 102 may instead be performed by or stored on one or more gaming devices 104, 106. Similarly, in some embodiments the user device 104 and/or the merchant device 106 may not be necessary. For example, various embodiments are directed to functions that may be performed entirely by the controller 102. Other embodiments may involve only the controller 102 and a merchant device 106 (e.g., a merchant requesting validation of an entitlement), or may involve only the user device 104 and the controller 102 (e.g., to provide game play for a player, to distribute entitlements to a user).

In operation, the controller 102 and the devices 104, 106 may exchange information about the use of the devices by individual users and/or merchants, messages, merchant information, game content, information about game conditions, and the like. In embodiments with a third-party server, the controller 102 and/or the user device 104 may exchange information about the use of the user device 104 by individual players, data about the players, messages, prize information, and the like, via the third-party server. The device 104 may, for example, provide information related to game conditions to the controller 102 (and/or a third-party server). The user device 104 (e.g., a game device) may further provide game performance and player data to the controller 102 (and/or a third-party server). The controller 102 (and/or a third-party server) may provide information about entitlement selections and/or historical information about the player, for example, to other devices.

It is worthwhile to note that the system 100 (and other systems described herein) may be arranged into a variety of configurations, with functionality residing in various locations. Various types of information may be transmitted between different devices. For example, the controller 102 may control most aspects of initiating a game session and/or providing one or more entitlements to a player. A signal may be received, for example, by a user device 104, which then provides play of a game and/or initiates an entitlement selection process. In one example, a player may download game software (e.g., from a web server) and install the software on his computer. When the game software executes, the software may request and/or receive information about prizes from the controller 102. In this way, the potential pool of prizes and other game content may be updated as desired when the game is played (e.g., for each game, from time to time), even if some or all of the basic program instructions for the game do not change. For instance, the player may be able to play for different prizes each time he plays.

In some embodiments, the controller 102 may reside in a user device 104. For example, a user device 104 (e.g., a kiosk) may control most aspects of playing a game and/or distributing promotional information. A user device 104 may not even have a network connection.

In some embodiments, merchant information (e.g., an offer, an entitlement sponsored by a merchant) may be determined by the controller 102, but a user device 104 may control when to provide game play. For example, a user device 104 may receive an indication of a product to offer the player from the controller 102, and the user device 104 then provides game play, monitors play and game parameters during the game session, and provides merchant-related information to the player (e.g., at the end of the game so the player can select a prize).

Note that a wide variety of other configurations are possible, some of which are discussed herein. It should be understood that methods of the invention may be implemented by one or more devices 104, 106, one or more controllers 102, other devices, and/or any combination thereof.

1. Controller

Figure 2:
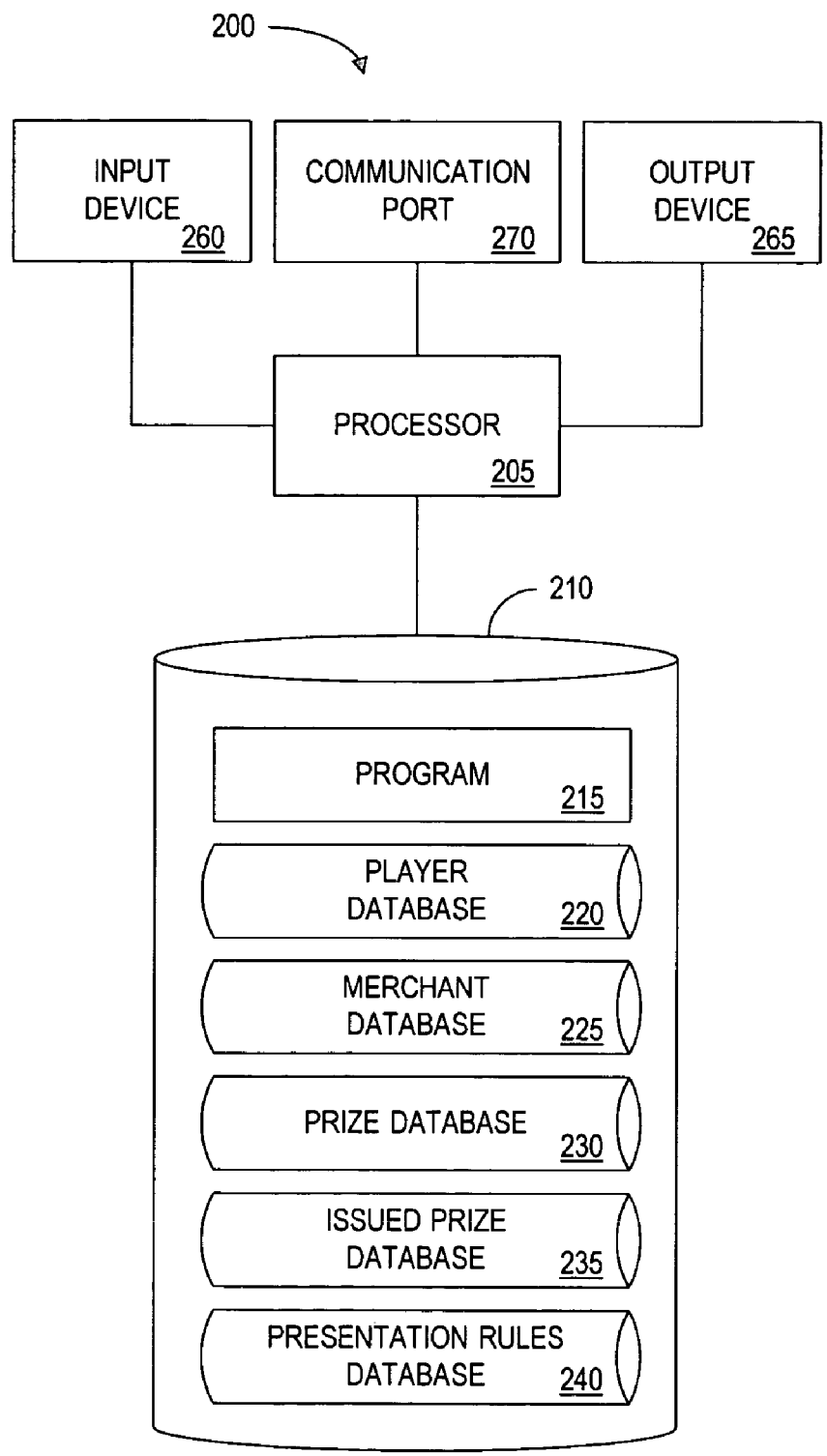
FIG. 2 is a diagram illustrating an example controller according to some embodiments of the present invention.

FIG. 2 illustrates an embodiment 200 of the controller 102 of FIG. 1. The controller 200 may be implemented as a system controller, a dedicated hardware circuit, an appropriately programmed general purpose computer such as an Intel-based PC, a server computer or any other equivalent electronic, mechanical or electromechanical device suited for providing any of various functionality described herein.

The controller 200 comprises a processor 205, such as one or more Intel® Pentium® processors. The processor 205 is in communication with a communication port 270 through which the processor 205 is able to communicate with one or more other devices.

The processor is in communication with at least one input device 260 and at least one output device 265. Various types of input devices such as keyboards, microphones, touch screens, and pointer devices (e.g., a mouse), are known to those of skill in the art. Similarly, various types of output devices such as display devices (e.g., LCD panel displays), speakers, printers, and radio transmitters are known to those of skill in the art.

The processor 205 is also in communication with a data storage device 210. The data storage device 210 comprises an appropriate combination of magnetic, optical and/or semi-conductor memory, and may include, for example, Random Access Memory (RAM), Read-Only Memory (ROM), a compact disc and/or a hard disk. The processor 205 and the storage device 210 may each be, for example: (i) located entirely within a single computer or other computing device; or (ii) connected to each other by a remote communication medium, such as a serial port cable, telephone line or radio frequency transceiver. In one embodiment, the controller may comprise one or more computers that are connected to a remote server computer for maintaining databases.

The data storage device 210 stores a program 215 for controlling the processor 205. The processor 205 performs instructions of the program 215, and thereby operates in accordance with the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 205 to interface with computer peripheral devices. Appropriate program elements are known to those skilled in the art, and need not be described in detail herein.

The term "computer-readable medium" as used herein refers to any medium that participates in providing instructions to the processor of a user device, merchant device or controller for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to a processor for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the user device or controller may obtain instructions in the form of a carrier wave.

According to an embodiment of the present invention, the instructions of the program 215 may be read into a main memory from another computer-readable medium, such as from a ROM to a RAM. Execution of sequences of the instructions in program 215 causes processor 205 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 210 also stores (i) a player database 220, (ii) a merchant database 225, (iii) a prize database 230, (iv) an issued prize database 235, and (v) a presentation rules database 240. The databases are described in detail below and depicted with exemplary entries in the accompanying figures. Note that, although these databases are described as being stored in the controller 102, in other embodiments of the present invention some or all of these databases may be partially or wholly stored in another device, such as one or more of the user devices, merchant devices, or a combination thereof.

Various functionality of the controller described herein may alternatively be performed by one or more of the user devices 104 and/or the merchant devices 106.

2. User Device/Merchant Device

Figure 3:
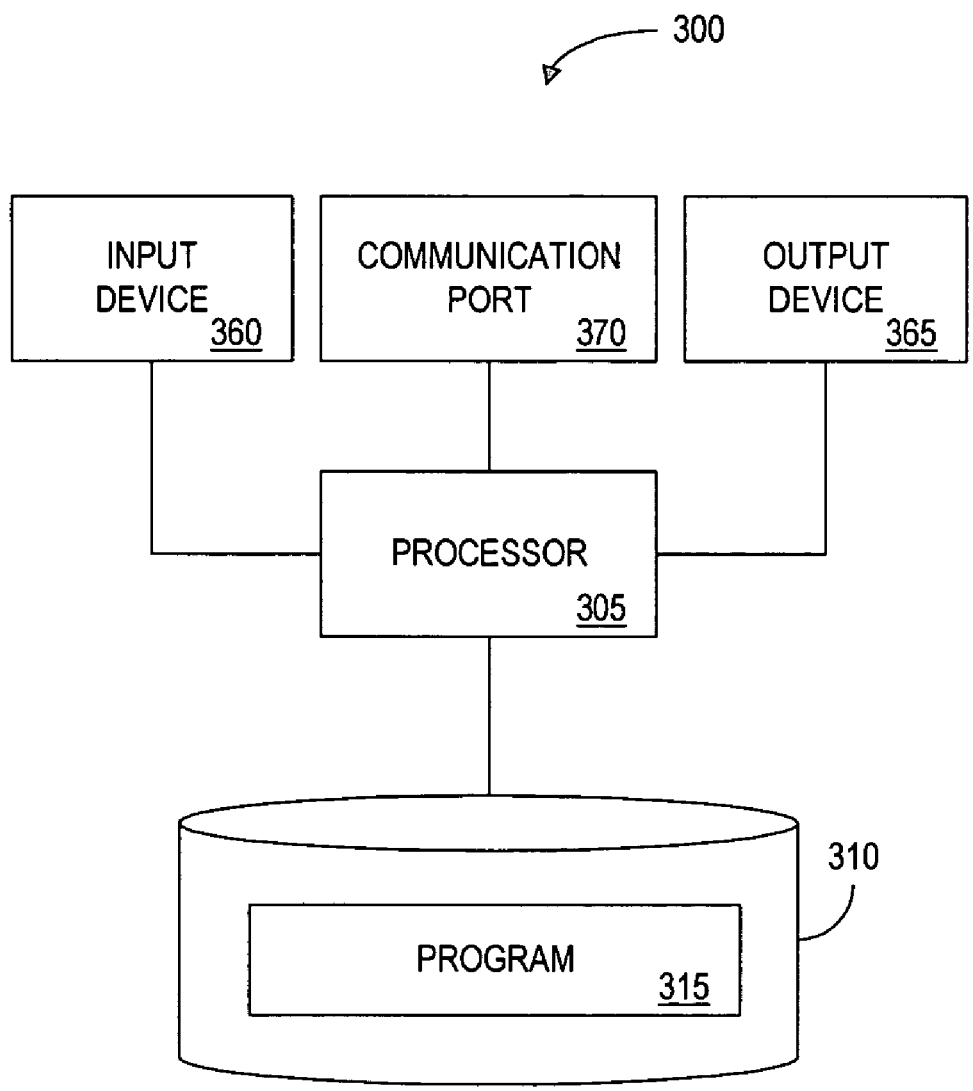
FIG. 3 is a diagram illustrating an example of a user device or merchant device according to some embodiments of the present invention.

FIG. 3 illustrates an embodiment 300 of the user device 104 and/or the merchant device 106 of FIG. 1. The device 300 may be implemented as a system controller, a dedicated hardware circuit, an appropriately programmed general purpose computer such as an Intel®-based personal computer, a server computer or any other equivalent electronic, mechanical or electromechanical device suited for providing any of various functionality described herein.

The device 300 comprises a processor 305, such as one or more Intel® Pentium® processors. The processor 305 is in communication with a communication port 370 through which the processor 305 is able to communicate with one or more other devices. The processor 305 is also in communication with at least one input device 360 and at least one output device 365. Input devices may include keyboards and pointer devices, for example, and output devices may include, for example, display devices and speakers. Display devices may comprise, for example, one or more display screens or areas for outputting information related to game play on the gaming device, such as a cathode ray tube (CRT) monitor, liquid crystal display (LCD) screen, or light emitting diode (LED) screen. Various other types of input devices and output devices are described herein, and still others will be readily apparent to those skilled in the art in light of the present disclosure.

The processor 305 is also in communication with a data storage device 310. The data storage device 310 comprises an appropriate combination of magnetic, optical and/or semiconductor memory, and may include, for example, Random Access Memory (RAM), Read-Only Memory (ROM), a compact disc and/or a hard disk. As with the example controller 200 described herein, the processor 305 and the storage device 310 may each be, for example: (i) located entirely within a single computer or other computing device; or (ii) connected to each other by a remote communication medium, such as a serial port cable, telephone line or radio frequency transceiver. In one embodiment, the device 300 may comprise one or more computers that are connected to a remote server computer for maintaining databases.

The data storage device 310 stores a program 315 for controlling the processor 305. The processor 305 performs instructions of the program 315, and thereby operates in accordance with the present invention, and particularly in accordance with the methods described in detail herein. The program 315 may be stored in a compressed, uncompiled and/or encrypted format. The program 315 furthermore includes program elements that may be necessary, such as an operating system, a database management system and "device drivers" for allowing the processor 305 to interface with computer peripheral devices. Appropriate program elements are known to those skilled in the art, and need not be described in detail herein.

In some embodiments, the device 300 may comprise a game device operable to allow a user to play one or more games. In one example, the game device may include one or more display screens, a keyboard or keypad, and a pointer device for use in playing a game. In another example, a user device 300 may receive game data from another device (e.g., a controller, a PDA) and present a game to the user based on the game data. In another example, the user device 300 may store game data and provide play of a game (e.g., in response to a request by a user, in response to a signal from a controller).

In some embodiments, the device 300 may comprise one or more validator devices. For example, a merchant may use a merchant device 300 to input a code (e.g., using a keypad, using a bar code scanner) provided by a user attempting to redeem a prize certificate. The merchant device 300 may then transmit a request to validate the code to a controller or third-party server.

3. Databases

Although databases 220, 225, 230, 235, 240 are depicted as residing at the controller 200 in the example embodiment of FIG. 2, it will be understood that one or more of these databases could just as easily be implemented on one or more other devices. Further, the individual database files could be stored on any number of different devices (e.g., located on different storage devices in different geographic locations, such as on a user device 104). For example, a user device and/or a merchant device may store a redundant copy of a controller's databases to protect against data loss or for any number of other reasons.

As will be understood by those skilled in the art, the schematic illustrations and accompanying descriptions of the sample databases presented herein are exemplary arrangements for stored representations of information. Other database arrangements may be used which would still be in keeping with the spirit and scope of the present invention. Any number of arrangements may be employed besides those suggested by the accompany figures. For example, even though a particular number of separate databases are illustrated, various embodiments of the invention could be practiced effectively using any number of functionally equivalent databases. In other words, the present invention could be implemented using any number of different database files or data structures, as opposed to the number depicted. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. Some examples of these processes are described in detail in this disclosure.

FIG. 4 depicts a tabular representation 400 of an example of a player database 220 according to some embodiments of the present invention. This particular tabular representation of a player database includes sample records or entries which each include information regarding a particular player. In some embodiments of the invention, a player database is used to track information about players including identity, contact information, preferences, game performance history, current activity, and demographics. Those skilled in the art will recognize that the player database 220 may include any number of entries or additional fields.

The tabular representation 400 also defines fields for each record or entry. The fields include: (i) a player identifier 402 that may store a representation uniquely identifying the player; (ii) a name 404 that may store a representation of the player's name; (iii) a financial account identifier 406 that may store information about an account associated with a user (e.g., a credit card account number); (iv) an address 408 that may store information about one or more addresses of a player (e.g., a street address, a telephone number, an IP address); (v) an email address 410 that is associated with the player; (vi) demographic information 412 that may include any of various types of information about a player such as a number of children, interests and marital status; and (vii) a geographic area preference 414 that may include an indication of one or more geographic areas to which the player would prefer any prizes or merchants were relevant (e.g., an indication of the player's preferred local edition of an online game).

As discussed herein, various types of contact or address information may be received and stored about a player (e.g., when a player registers with a website), including a street address, an e-mail address, and/or a telephone number. A controller 102 may utilize information in the player database 220 when determining, for example, what type of merchant, product, and/or prize information to present to a player.

FIG. 5 depicts a tabular representation 500 of an example of a merchant database 225 according to some embodiments of the present invention. This particular tabular representation of a merchant database includes sample records or entries which each include information regarding a particular merchant. In some embodiments of the invention, a merchant database is used to track information about merchants including identity, contact information, and geographic information. Those skilled in the art will recognize that the merchant database 225 may include any number of entries or additional fields.

The tabular representation 500 also defines fields for each record or entry. The fields include: (i) a merchant identifier 502 that may store a representation uniquely identifying the merchant; (ii) a name 504 that may store a representation of the merchant's name (e.g., a name of a retail establishment, a name under which a merchant conducts business); (iii) an address 506 that may store information about one or more addresses of a merchant (e.g., a street address, a telephone number, an IP address); (iv) geographic information 508 that includes an indication of one or more geographic regions and/or locations; (v) a category 510 that includes an indication of at least one category of products offered by the merchant (e.g., a standard industry code (SIC)); and (vi) a description 512 that includes a description of the merchant and/or the merchant's offerings.

As discussed herein, various types of information may be received and stored about a merchant (e.g., when a merchant registers with a website), including a street address, business hours, an e-mail address, driving directions, and/or a telephone number.

According to some embodiments of the present invention, the controller 102 might utilize information in the merchant database 225 when determining, for example, what type of merchant, product, and/or prize information to present to a player. In some embodiments, geographic information 508 may be useful in determining whether to use a particular merchant, or a prize associated with a merchant, in a game. For example, if a player indicates he would like to play the "Greenwich, Conn." edition of a game, the controller 102 may refer to merchant database 225 to identify one or more merchants based on their geographic information. Geographic information 508 may indicate an actual place of business of a merchant and/or may indicate one or more regions/locations/game editions in which the merchant would like to be promoted (or in which the controller 102 would like to promote that merchant). For instance, a player playing a "Stamford, Conn." edition of a game might be presented with information about a merchant in White Plains, N.Y., based on an indication in the merchant database 225 that the merchant wanted to be promoted to players who are from Stamford (or at least who appear to be willing to redeem prizes in Stamford).

FIG. 6 is a tabular representation 600 of the prize database 230. The tabular representation 600 includes a number of example records or entries, each defining a prize (e.g., offer, entitlement, product) that may be or has been provided. In some embodiments of the invention, a prize database may be used to manage and track information about prizes including a prize category, an associated sponsoring merchant, and a prize quantity. Those skilled in the art will understand that the prize database 230 may include any number of entries.

The tabular representation 600 also defines fields for each record or entry. The fields specify: (i) a prize identifier 602, which uniquely identifies a particular prize; (ii) a merchant identifier 604, which uniquely identifies a particular merchant sponsoring or otherwise associated with the particular prize; (iii) a description 606 of the particular prize; (iv) a prize category 608 that may indicate one or more categories corresponding to the prize (e.g., "dinner entrée," "dry cleaning"); (v) a number of units available 610, which includes an indication of how many instances of the corresponding prize remain available (e.g., for selection by a user as a prize); and (vi) conditions 612, which includes an indication of one or more terms or conditions (if any) that may be associated with the prize (e.g., as established by the merchant and/or controller).

Of course, the prize database 230 may include any additional or alternative information about prizes, as deemed practicable for a particular application. For example, information such as a number of times a prize has been presented, selected, rejected, and/or redeemed may be included. In another example, the prize database 230 may store an indication of the retail value of a prize and/or an indication of an amount paid to a merchant for the prize.

It will be understood that the merchant identifier 604 may be used, in some embodiments, to look up or otherwise determine additional merchant-related information (as may be represented in the merchant database 225).

FIG. 7 is a tabular representation 700 of the issued prizes database 235. The tabular representation of the issued prizes database 235 includes a number of example records or entries, each defining a prize that has been issued to a user (e.g., awarded to and/or selected by a player). In some embodiments, information in the issued prizes database 235 may be useful in managing and tracking the redemption of issued prizes. Those skilled in the art will understand that the issued prizes database 235 may include any number of entries.

The tabular representation 700 also defines fields for each record or entry. The fields specify: (i) an issued prize identifier 702, which uniquely identifies a prize (e.g., offer, entitlement) that has been issued; (ii) a player identifier 704 that identifies a player to whom the prize was issued; (iii) a date issued 706 that indicates a time and/or date when the corresponding prize was issued; (iv) an expiration date 708 that indicates a time and/or date when the prize (e.g., an issued entitlement) will expire; and (v) a redemption date 710 that indicates a time and/or date the prize was redeemed (e.g., by presenting a voucher at a corresponding merchant).

FIG. 8 is a tabular representation 800 of the presentation rules database 240. The tabular representation of the presentation rules database includes a number of example records or entries, each defining an exemplary rule. In some embodiments, a rule may be used in determining whether to present information about a particular merchant, and what information to present. In some embodiments, a rule may be used in determining whether to provide one or more entitlements, offers, or other type of prizes, and might be used alternatively or in addition in determining game content to use in providing a game for a player. Those skilled in the art will understand that the presentation rules database 240 may include any number of entries.

The tabular representation 800 also defines fields for each of the entries or records. The fields specify: (i) a rule identifier 802, which uniquely identifies a particular rule; (ii) a description 804, which includes a description of the corresponding rule; and (iii) a subject 806, which includes an indication of one or more prizes and/or merchants that may be specifically subject to the rule.

In one embodiment, the controller 102 may operate in accordance with one or more databases of rules. Various embodiments of the present invention may be implemented by merely defining and selecting appropriate rules to govern the functionality of the controller, for example, in determining when to present a prize, what prizes to make available to a player, and/or what types of merchant-related content to include in a game. In some embodiments, prizes to be made available to a user may be determined in light of various types of stored presentation rules. Accordingly, the controller 102 may utilize information stored in presentation rules database 240 in some embodiments for determining what type of merchant-related information (e.g., prizes, merchant advertising) to present to a user.

D. Processes

The exemplary system discussed above, including the described hardware components, software components, and the databases, are useful to perform various methods of the invention. However, it should be understood that not all of the above-described components and databases are necessary to perform any of the methods of the present invention. In fact, in some embodiments, none of the above-described system is required to practice the methods of the present invention. The system described above is merely an example of a system that would be useful in practicing some methods of the invention.

Figure 9:
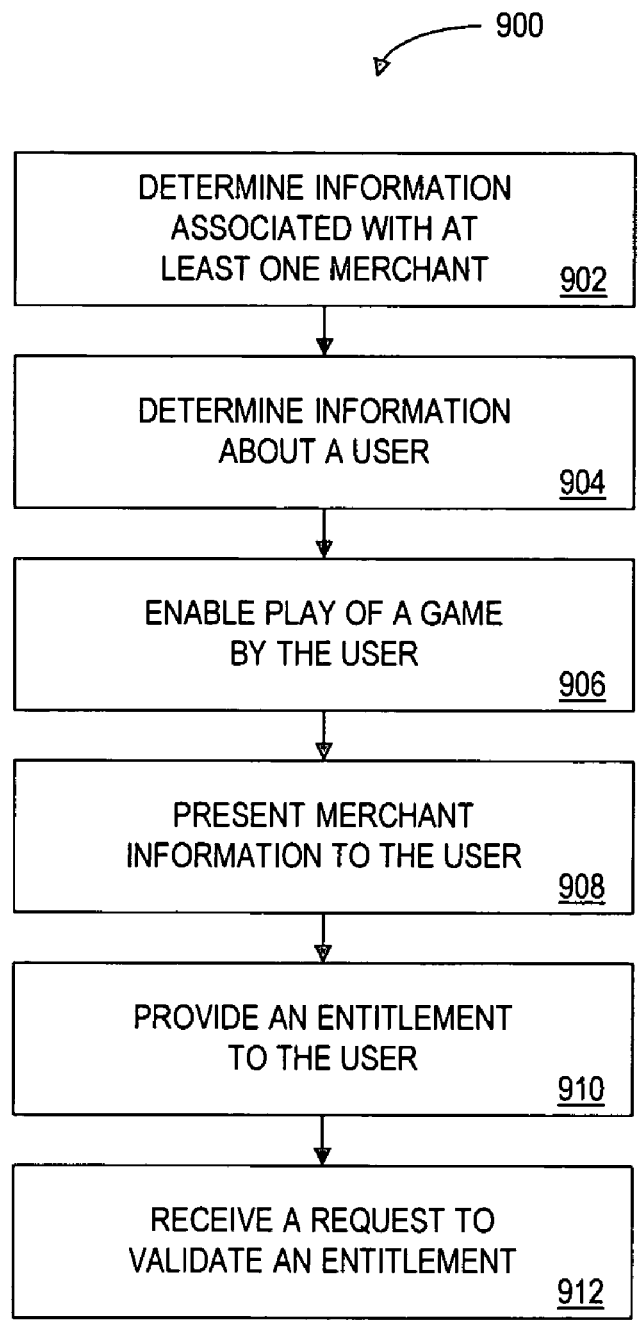
FIG. 9 is a flow chart illustrating an example process according to some embodiments of the present invention.

Referring to FIG. 9, a flow chart 900 is depicted that represents some embodiments of the present invention. Although the method 900 is discussed as being performed by a controller, it will be understood in light of the present disclosure that various aspects of the exemplary method may be performed by a controller, a game server, a user device, a merchant device, or any combination of the devices and/or computers described herein. For example, in some embodiments, some or all of the method steps may be executed by one or more servers physically located within a particular geographic region.

It must be understood that the particular arrangement of elements in the flow chart 900 of FIG. 9 (as well as the number and order of example steps of other various methods discussed herein) is not meant to imply a fixed order, sequence, quantity, and/or timing to the steps. Embodiments of the present invention can be practiced in any order, sequence, and/or timing that is practicable. Likewise, the labels used to reference the individual steps of the methods are not meant to imply a fixed order, sequence, quantity, and/or timing to the steps.

In general terms and still referring to FIG. 9, method steps of some embodiments of the present invention may be summarized as follows. In step 902, information associated with at least one merchant is determined. In step 904, information about a user is determined. In step 906, play of a game by the user is enabled. In step 908, merchant information is presented to the user. In step 910, an entitlement is provided to the user. In step 912, a request to validate an entitlement is received. In the discussion that follows, each of these exemplary steps will be discussed in greater detail.

Note that not all of these steps are required to perform the methods of the present invention and that additional and/or alternative steps are also discussed below. For example, some processes of the present invention may not require any functionality related to validation, determining information about a user, or both. Also note that the above general steps represent features of only some of the embodiments of the present invention. In some embodiments these exemplary steps may be performed in a different order. More, fewer, and/or alternative steps may be used as well. Such steps may be combined and/or subdivided in any number of different ways so that methods of the present invention include more or fewer actual steps. For example, in some embodiments additional steps may be added to update and maintain the databases described above. As indicated, however, it is not necessary to use the above-described databases in all embodiments of the invention. In some embodiments, a described step may be performed by or with respect to any number of devices or entities. For example, a step may be subdivided into sub-steps, some of which are performed by one device, and some of which are performed by or otherwise involve a different device. In other words, the methods of the present invention may contain any number of steps performed by any number of entities that are practicable to implement the various different inventive processes described herein.

1. Information Associated with One or More Merchants is Determined

In step 902, information associated with one or more merchants is determined. For example, such information may be received from a merchant, a third party, or retrieved from one or more databases (e.g., merchant database 225). In some embodiments, a controller may receive or otherwise determine information such as a merchant's name and type of business. Merchant-related information might also include information about a location of a merchant, such as place(s) of business (e.g., town, street address), contact information (e.g., mailing address, telephone number, fax number), driving directions, business hours, and/or geographic region. Alternatively, or in addition, information associated with a merchant may include information about products or services available through the merchant and/or offers or promotions by the merchant (e.g., a discount on a large pizza). In some embodiments, information associated with a merchant is stored in a database (e.g., merchant database 225). For example, a new database record may be created for a merchant, or an existing record for a particular merchant might be updated.

In some embodiments, information associated with a merchant may include information about one or more product guarantees, offers, retail entitlements, prizes or other types of benefits. Such benefits may be sponsored by the merchant and/or provided by the merchant to the controller, for example, and may be made available to users (e.g., as a prize in a game), as discussed herein.

In some embodiments, a game system receives at least one offer or entitlement from each of at least two merchants.

Optionally, the controller may provide a payment to the merchant in exchange for the benefit. Thus, the controller may or may not pay a merchant for a prize (e.g., an entitlement).

In some embodiments, a merchant may pay a fee to post a prize to the system. For example, a merchant may be charged a fee for having a sponsored prize included (or potentially included) in a prize showcase, for having a sponsored prize selected by a user, and/or for having information related to the merchant (e.g., business location, product offerings, merchandise pricing) included (or potentially included) in the presentation of a game (e.g., as an advertisement, as part of a game question).

As discussed herein, one or more conditions may be associated with an entitlement, offer, or other type of prize. Any terms and conditions related to an entitlement may be specified by a merchant and/or by a controller. In some embodiments, such terms may be stored in the prize database 230 and/or the presentation rules database 240. Terms may include, without limitation, (i) a number of instances of a particular offer or entitlement that may be distributed, or a quantity or amount of goods and/or services associated with a particular offer (e.g., if an offer is a "medium pizza," a merchant may agree to sponsor two hundred medium pizzas to a game show system); (ii) a description or details of an entitlement (e.g., "a 12-inch cheese pizza with one topping"); (iii) redemption terms and conditions or other restrictions associated with an entitlement (e.g., "Offer valid from 11 a.m.-2 p.m. only"); (iv) any fees associated with the provision of a prize to the inventory of the system (e.g., a game show system pays $0.75 to a merchant for each unit or instance of a "medium pizza" offer provided by the merchant as a prize); (v) a time period during which an offer or entitlement may be presented to system users (e.g., during the month of June only); (vi) a velocity or frequency with which an offer may be presented to users (e.g., present the offer as frequently as possible); and/or (vii) any other terms or information associated with a prize. In some embodiments, an offer, for example, may be considered "received" by a central controller once any offer terms have been mutually agreed upon by a merchant and the central controller (e.g., a game show provider) or agent thereof.

In one example, a condition for redemption may be that a user must present to the merchant a specially designed certificate issued to the user by the controller (e.g., a certificate bearing the name of the user and the name of a product to be provided). Details of an exemplary redemption process are discussed further herein. In another example, a merchant may be able to indicate information about an offer or retail entitlement via a website by entering data about terms and conditions governing the redemption of any retail entitlements available for particular goods or services (e.g., a given entitlement may only be redeemable between the hours of 2 p.m. and 5 p.m., Monday through Friday).

In various embodiments, a controller may receive information about an entitlement (e.g., an offer) from a merchant by employing one or more of a variety of methods. In some embodiments, merchants may provide various kinds of information (e.g., data about goods and services) by registering it with a controller (e.g., via a website).

In one example, according to at least one embodiment, retail merchants from various geographic areas may provide information by (1) using a personal computer to log on to a website hosted by the controller; (2) providing data about the merchant such as name, store locations, financial account identifiers, etc. (e.g., by entering the data into corresponding data entry fields); and (3) providing data regarding goods or services offered by the merchant (e.g., product names, prices, product descriptions, product category). In some embodiments, merchants may be allowed to select (e.g., from a menu of options) or otherwise indicate one or more geographical areas they would like to acquire customers from, and/or geographical editions of a game they would like to be included in. Further, retail merchants may transmit files containing digital images representative of products offered by the merchant.

In other exemplary embodiments, a merchant may communicate such information to a game show system. For example, a merchant and a game show system (or representative thereof) may communicate (e.g., in person or via a telephone conversation) so as to determine the details associated with an anticipated provision by the merchant of an offer. In another example, a merchant may submit desired offer terms by (i) sending a facsimile, (ii) sending electronic or postal mail, (iii) completing a form on a website (e.g., provided by a game show system), and/or (iv) any other practicable means, electronic or otherwise, of communicating such information.

A controller may choose to reject any submitted offer terms, and/or may collaborate with a merchant to revise such offer terms until they are considered mutually satisfactory. In further embodiments, merchants may only submit offer terms subject to constraints already communicated by a game system (e.g., a game show system provides facsimile forms by which a merchant may configure or select from a finite number of offer variables).

In one example of receiving information about a product guarantee, Susan's Diner may indicate to the controller a promise to provide a free appetizer to the bearer of an appropriate certificate. In return for the guarantee, Susan's Diner may receive a payment of $0.50 from the controller. In aggregate for a week, Susan's Diner may make twenty-five such product guarantees. Therefore, for the week, Susan's Diner may receive a total payment of $12.50, and may ultimately give away twenty-five appetizers to users bearing appropriate certificates.

Other types of information that may be associated with a merchant and determined by a controller will be readily apparent to those having skill in the art in light of the present disclosure.

In some embodiments of the present invention, one or more merchants may participate in an online game system by submitting at least one offer each (e.g., for products or services) to a controller (e.g., a game server). One or more players of the game may then be able to win, claim and/or redeem at least one of the offers after playing one or more games provided by the game, as discussed further herein.

In some embodiments, a system controller may receive offers from a plurality of merchants. In some embodiments, merchants provide or sponsor only one offer or other prize each. In other embodiments, each merchant may provide a plurality of prizes (e.g., to a game system). For example, Super-Clean Car Wash may provide several units each of an "express car wash" offer, "ultimate car wash" offer and "interior detailing service" offer. A wider variety of prizes available to the game system may enable the system to serve the tastes of different consumers, which may in turn have a positive effect on the rate at which users accept prizes (and potentially patronize sponsoring retailers).

Any or all of the data associated with one or more merchants could be incorporated into one or more games as game elements. For example, the controller may use such data to formulate and output price-oriented questions regarding a merchant's products. Alternatively or additionally, the controller may use such received data to allocate game prizes to users (e.g., based on an indicated location of a merchant and/or player).

In some embodiments, as information about merchants, products and/or prizes is received, such information may be entered in a database (e.g., prize database 230). For example, a game show system receiving an indication that a car wash is providing one hundred units of a Super-Clean Car Wash "ultimate car wash" offer, such information may be stored in the prize database 230.

In some embodiments, a game system (or agent thereof) may receive entitlement data or other information related to a merchant and may subsequently update prize database 230 and/or merchant database 225 accordingly. In further embodiments, a merchant may interact substantially directly with one or more game system databases for the purpose of providing one or more offers to a game system. For example, a merchant provides prize data by filling out a form on a website or answering the prompts of an Interactive Voice Response telephone unit, and a prize database is automatically populated or modified as necessary with the information.

2. Information about a User is Determined

In step 904, information about a user is determined. In some embodiments, determining information about a user may include the central controller determining geographic data associated with a user. For example, a user may have communicated with the controller (e.g., by logging onto a website hosted by the controller), and the determination could be based on the user's selection of a local-area edition of a game offered via the website. For example, the user may have selected a "Stamford, Conn." version of a game from a plurality of available versions, or otherwise expressed a geographic preference. Determining the geographic data might then include determining which version of a game a user has selected or indicated and/or determining geographic information related to a selected game.

In other embodiments, the controller could determine geographic data associated with the user by determining the user's phone number (or portion thereof, such as a three digit local-area prefix), ZIP code, GPS coordinates, or by determining the IP address of a user device. The controller could make this determination by requesting and receiving geographic data from the user. For example, the user's geographic data could be determined by asking for the user's credit card number, and retrieving a corresponding billing address from a local or remote account database.

In some embodiments, information about a user may be communicated to the controller by the user, for example, by phone or using a personal computer (e.g., over the Internet). In one example, a user could provide various user information, such as his name, address, contact information, and financial account information. For instance, the user may enter data in corresponding data fields of a website hosted by or operated by or on behalf of the controller, in a well-known manner. Of course, many other ways of providing user information to a controller will be readily understood by those skilled in the art, in light of the present disclosure.

In one or more embodiments, a user who desires to play a game (e.g., in order to receive a prize) must first register with the controller. To register, a user may, for example, employ a user terminal (e.g., a PDA, cell phone) to log onto the Internet and to visit a website hosted by the controller. Registration may make the user eligible to play one or more games and/or win prizes on the controller's website.

3. Enable Play of a Game by the User

In step 906, play of a game by the user is enabled. According to some embodiments of the present invention, the user may be allowed to play one or more games (or portions of a game). For example, the user may visit a website and be allowed to play an online game. Many types of games may be made available for play; some examples of games are described herein, and still others will be readily apparent to those of skill in the art.

For example, the game may involve skill, luck, or a combination of the two. A game may involve answering questions, such as trivia questions. In another example, a game may involve solving a puzzle, such as a crossword puzzle, acrostic, or cryptogram. Other puzzles may include jigsaw puzzles or puzzles like Rubik's Cube®. The game may involve playing a version of a board game, such as, for example, Monopoly®, Scrabble®, Life®, Trivial Pursuit®, checkers, or chess. The game may involve play of a card game, such as war, poker, Bridge, Hearts, Uno®, etc. In some embodiments, the game may involve play of a video game, such as Minesweeper, Frogger™, Super Mario Bros.™, or any other type of video or arcade game. As will be appreciated, many other games might be played in accordance with various embodiments of the present invention.

In some embodiments, enabling play of a game may comprise determining a game to enable and/or generating some or all of the content for a game. In one example, once the controller has configured the game (e.g., by selecting particular content based on the version of the game requested by the user and/or geographic data), the controller permits the customer to play the game.

In some embodiments, enabling play of a game may include transmitting game content to a user device 104 and/or transmitting a signal instructing the user device 104 to provide play of the game (e.g., some or all of the game content may be stored at the user device 104).

In some embodiments, allowing the user to play a game may comprise the controller initiating play of the game. For example, the controller may present to the user an initial question in a trivia game, an initial puzzle state in a puzzle game, an initial setup in a board game, an initial hand of cards in a card game, etc. In at least one embodiment, the central controller may initiate a game process by presenting one or more introductory or instructional screens that explain aspects of game play, winning prizes, and/or prize redemption. Of course, such instructional information may be presented at any time and/or made available to the user throughout the game (e.g., by clicking on a link on a webpage). In some embodiments, the user device may initiate play of the game.

Initiating the game may include determining a first game event (e.g., a question) to present to the user. For example, the controller may output a first question and then identify the customer's response (if any) to the first question.

A user may or may not be required to pay to play a game. Thus, enabling play of a game may but need not include receiving a payment (or indication of payment) by a user. If a user does pay, the payment may be made from the user's financial account, such as a credit card account (e.g., as indicated in the player database 220). Alternatively, the payment may be made from an account established with the controller.

In some embodiments of the present invention, providing game play may include configuring or rendering the game based on information associated with one or more merchants (e.g., prize information) and/or information associated with the user. For example, the controller may determine at least one game element based on the geographic data associated with the user and data associated with at least one merchant. In some embodiments, such a determination may be made by querying one or more databases and by identifying a game file corresponding to the geographic data. For instance, the controller may use the customer's selection of "Stamford, Conn." as the basis for determining which of a plurality of games, or which version of a game, to provide.

Alternatively, or in addition, in some embodiments, such a determination may be made by identifying merchants and/or products corresponding to the user's geographic data (e.g., by querying the merchant and/or prize databases). Thus, such merchant and/or product information could be used by the controller in configuring a game. For example, certain game and/or prize screens could be populated with geographically relevant merchant-related data. For instance, if a player selects a geographical area (e.g., a town or county), the controller may (i) query a database, (ii) identify products offered and/or merchants located within that geographical area, and (iii) assemble and display a product "showcase" comprising the identified products.

In some additional embodiments, such a determination may be made by determining whether a numerical limit associated with a particular retail entitlement has been reached. Such numerical limits may be determined, for example, based on information received from a merchant, as discussed herein (e.g., how many of a particular type of prize a merchant is willing to sponsor). For example, numerical limits may be employed to ensure that not more than a given number of retail entitlements are distributed to players through a game system. For instance, a given retailer may wish to provide only one hundred retail entitlements for bottles of Brand Y Soda. Once one hundred of such retail entitlements have been distributed, the controller may refrain from configuring games with images of and/or questions about Brand Y Soda.

Figure 11:
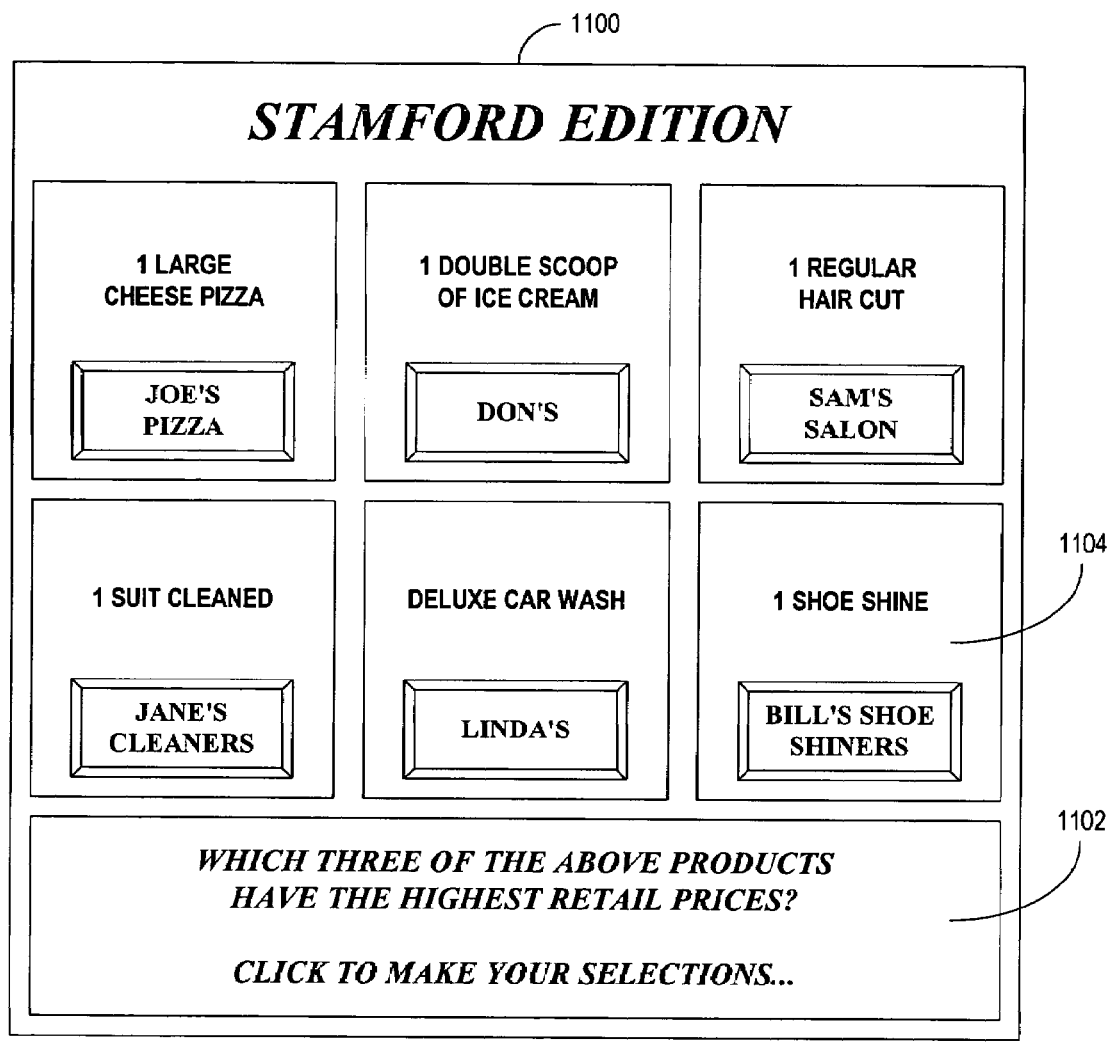
FIG. 11 depicts an example screen of a game according to some embodiments of the present invention.

In one or more embodiments, information about products and/or services marketed by a retailer may be incorporated into the play of the game. In some embodiments, such information may relate to prizes (e.g., offers, entitlements) for which the user is playing or for which the user may become eligible (e.g., based on game play). For example, in a trivia game, questions may be asked that test a user's knowledge of the retail prices of products for which the user is playing, or knowledge of one or more merchants sponsoring prizes in a showcase. FIG. 11 depicts one example game screen 1100 including a price-oriented question about products and services in a local edition of an online game. The message 1102 instructs the player to select the three items that have the highest retail prices from the set of six displayed products and services. The graphics displayed for the products (e.g., image 1104) indicate a brief description of each product and the merchant offering the product. In some embodiments, additional information (e.g., a merchant location, more detailed description of the product) may be available about the product (e.g., by rolling over an image with a pointer, by clicking on an image). To indicate a product is a correct answer, the player is instructed to click on a depicted graphic (e.g., image 1104) corresponding to that product (e.g., by using a mouse or other pointer device).

Of course, other types of games may incorporate such information as well. For example, in a game involving the assembly of a jigsaw puzzle, the picture formed by the puzzle may depict one or more products for which a user is playing. In a crossword puzzle game, one or more words in the crossword puzzle may be the name of a product for which the user is playing. In a Scrabble™ game, the user's performance may be scored higher if the user makes words consisting of the names of presented products. In one or more embodiments, a game may incorporate information about every prize for which a user is playing (e.g., about every product in a product showcase from which the user may become eligible to select one or more prizes).

Play of a game may continue through one or more rounds (e.g., a series of questions) or component games. For example, a question-and-answer process may repeat a predetermined number of times (e.g., four times). A session of a game show, for example, may include one or more component games. In some embodiments, component games may involve testing the skill of a contestant in relation to the sorting, ranking, selecting, choosing and/or grouping of certain game icons. In some embodiments, one or more component games may be played sequentially within a game session. In further embodiments, a game contestant who successfully plays one or more component games may aggregate value (e.g., currency, points, etc.) or some measure of performance that may be used, for example, in determining whether the contestant may select one or more prizes (e.g., upon the completion of a game show session).

Thus, in accordance with some embodiments of the present invention, after receiving information about one or more prizes from a merchant (and preferably from multiple merchants), a controller may then allow users to earn value (e.g., based on a measure of performance) toward one or more prizes. Alternatively, or in addition, a player's performance may determine whether or not the player is even given the opportunity to select one or more entitlements as a prize.

In some embodiments, a user is allowed to play a game for the opportunity to obtain one or more products for a relatively small financial outlay (e.g., the difference between a Prize Meter amount and an average retail price). For instance, the user may play a game for the opportunity to obtain one or more products for an outlay of between zero and thirty percent of the retail prices of one or more products.

In various embodiments of the present invention, the controller may also determine and/or adjust a measure of performance of the player (e.g., as might be represented in a Prize Meter or Price Tag). In some embodiments, the measure of performance may be based on the player's skill (e.g., ability to answer a question correctly). In some embodiments, the controller may evaluate the correctness of a player's responses to game questions, challenges, or other game events, for example, by comparing the player's indicated responses against a database of stored answers. Alternatively, or in addition, a measure of performance may be based on one or more factors unrelated to the player's skill or ability to play the game (e.g., a random event or preferential increase in a player's game score).

Based on various factors, a measure of performance may increase, decrease, both increase and decrease, or remain unchanged during the course of a game. In one example, a value represented on a Prize Meter may be increased based on the customer's correct responses. In another example, a value associated with a Price Tag icon may be adjusted downward based on the customer's correct responses.

Some measures of a user's performance in a game may include and/or be based on, without limitation:

a) A number of questions a user has answered correctly in a trivia game.
b) A number of answers a user has correctly chosen for a single trivia question (e.g., in a game in which a user must select multiple answers to a question).
c) An amount of progress a user has made towards solving a puzzle.
d) An outcome a user has obtained in a game of chance. For example, in a slot machine game, a measure of a user's performance may include whether the user has obtained a typical winning outcome, such as "7-7-7" or a typical losing outcome, such as "bar-orange-lemon." A user's performance in a game of chance may be made by reference to a pay table. For example, a pay table may correlate an amount by which credit amount is to increase with each possible outcome that may be obtained in the game of chance.
e) An appraisal of how "good" a move made by the user was in a game of skill. For example, in a game of Scrabble®, when there were multiple possible words available for the user to create, the performance of the user may be based on whether the user found the highest-scoring word possible, the second highest-scoring word possible, etc.
f) An amount of time it takes a player to complete a game event, such as a round of a game.
g) A score a player has achieved in a game.
h) A performance of a player relative to the performance of a real or simulated opponent.
i) A performance of a player relative to his own prior performance. For example, measures of a user's performance may include measures of the user's improvement since the last time he played a game.
j) A number of questions, rounds, or other game events in a game. In a game with a relatively few number of questions, for example, each increase in a player's Prize Meter may be relatively large. However, in a game with relatively large number of questions, each increase may be relatively small, since the user may then have more chances to increase the Prize Meter value.
k) A target price. One or more factors used in determining a measure of performance may have the object of biasing a final value (e.g., a price level) to fall within a certain range (e.g., as desired by a merchant and/or controller). For example, the amount of a price level increase may be relatively larger if a target price is high, and may be relatively smaller if a target price is low. In this way, a user may be more likely to obtain a final price level that is within a predetermined range of the target price, regardless of what the target price is. For example, it may be desirable that the final price level falls in the range from $0.50 to $1.00 below the target price. In this way, the controller may make a small profit from selling a product entitlement to the user, assuming the controller has paid less than $0.50 to the merchant for the entitlement.
l) A value of one or more products or other prizes the user may be (or may become) eligible to obtain. For example, for relatively more valuable products, Prize Meter increases may be smaller. For relatively less valuable products, Prize Meter increases may be larger. Of course, the value of a product may be measured in a number of ways, and may be based on the product's retail price, manufacturing cost, utility value, etc.
m) An amount that the controller paid for one or more prizes. For example, the price the controller paid a merchant for providing a particular entitlement to the system, and for which the player may be playing (e.g., as included in a showcase). Performance measure increases may be relatively large for relatively small amounts paid, and may be relatively small for relatively large amounts paid.
n) A current stage or component of the game. For example, performance measure increases may tend to be larger in later stages of a game than they are in earlier stages. This may allow, for example, the user to finish a game "on a high note" by having achieved a relatively large performance measure increase near the end.
o) Chance. In one or more embodiments, the amount by which a measure of performance is modified may be determined, at least in part, through the outcome of a random or pseudo-random process. For example, a credit amount increase may be equal to $0.45+x, where x is a random variable which may take on any value between 0 and $1.00 with equal probability. Thus, a credit amount may increase by a random amount between $0.45 and $1.45.

In one example of a Prize Meter embodiment, throughout a game (e.g., after each question and answer), the controller communicates a user's success in answering questions (e.g., based on merchants and/or products available in a geographic area) by adjusting a depicted Prize Meter. The Prize Meter represents an amount of credit the player has won toward the purchase of at least one product in a showcase. At the end of the game, as discussed further herein, the prospective customer may elect to pay the difference between the final Prize Meter amount and a target price, which may represent the average retail price of the items in the showcase. Payment of this difference to the controller would allow the customer to redeem at least one showcased product from a retailer (e.g., within a selected geographical region).

In one example of an alternative Price Tag embodiment, based on the prospective customer's success in answering questions about products sold by merchants within the selected geographic region, for example, a Price Tag amount is adjusted. At the end of the game, the user may elect to pay the Price Tag amount. Payment of the Price Tag amount to the controller would provide the customer the right to redeem at least one product from a retailer within the selected geographic region.

Figure 12:
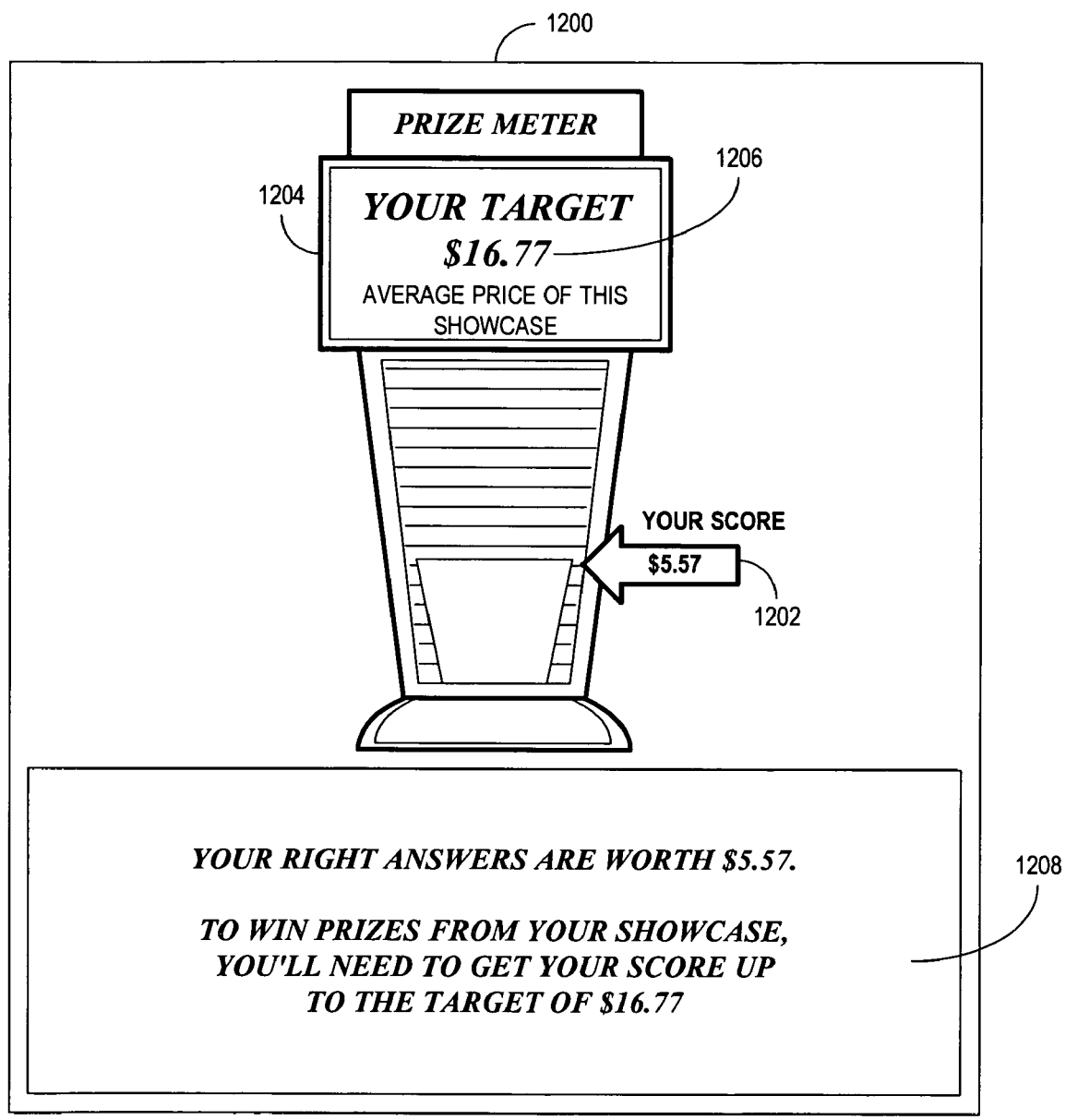
FIG. 12 depicts an example screen of a game according to some embodiments of the present invention.

FIG. 12 depicts an example game screen 1200 that includes a graphic representation of a value 1202 (e.g., a score of $5.57) achieved by a player. The example screen also includes a representation of a meter 1204 (e.g., the Prize Meter). The meter indicates the performance of the player relative to a target price 1206 (e.g., $16.77). The game screen 1200 also indicates that the target price 1206 is the average retail price of a showcase of prizes (e.g., on which one or more game questions may be based, from which a player may later choose a prize if eligible). The sample message 1208 communicates information to the player about the player's performance in a round, indicates the player's score at that point in the game, and conveniently reminds the player of the goal of attaining the target price in order to be eligible for one or more prizes.

In some embodiments, users may achieve "price levels" applicable to one or more products associated with product guarantees or other types of entitlements. A price level counts towards the purchase of one or more products (e.g., an earned discount off of a "retail price" or target price). For example, a player may win a price level for one or more products based on game play. For instance, at the initiation of the game, the user may begin with a price level of $0.00. However, the beginning price level may, in various embodiments, take on other values. For example, after one or more activities in the game, the controller may modify the price level. In one or more embodiments, the controller may modify the price level based on the user's play of the game. For instance, if the user has done well in the game (e.g., come closer to one or more game objectives), then the controller may increase the price level by a relatively large amount. However, if the user has done poorly in the game, then the controller may increase the price level by a relatively small amount. The controller may even leave the price level unchanged, or may decrease the price level. In one or more embodiments, a measure of a user's performance may be directly related to the skill exhibited by the user in the game. For instance, the better the user's performance in the game, the higher the price level. Therefore, through skillful play of a game, a user may earn a high price level, and may thereby acquire one or more products for a small financial outlay.

Reference is now made to an example trivia game in which the user is presented with a single question and may or must select multiple answers. In one exemplary question, a user is presented with multiple illustrations and/or text descriptions of products. The user is asked to indicate each product whose retail price is below $9.00. For instance, the question might read, "Click on the three products below that retail for less than $9.00." In such a game, the amount of increase in a price level may depend on the number of correct answers chosen. For example, if the user chooses no correct answers, then the price level may remain the same. If the user chooses exactly one correct answer, then the price level may be increased by $0.25. If the user chooses exactly two correct answers, then the price level may be increased by $1.00. If the user chooses exactly three correct answers, then the price level may be increased by $2.00.

In one embodiment, a table may be stored in the memory of a controller, for example. The table stores information representing an amount by which a price level is to be increased depending on the number of correct answers a user provides for a question. The amount of the price level increase need not be strictly proportional to the number of correct answers provided.

In one or more embodiments, it may be desirable that a measure of performance (e.g., a game score) increases after every question, round, or other game event. This may reduce the likelihood that a user becomes discouraged while playing the game. Therefore, in one embodiment, the controller provides a question to the user that the user will answer correctly. For example, the question says, "Select the three items below that retail for the highest prices." The user is given five answer choices. If there are only two (or fewer) incorrect answer choices, and the user must select three choices, the user is guaranteed to get at least one correct answer. Therefore, in an embodiment in which a Prize Meter is increased upon the selection of any correct answer, the user is guaranteed to obtain an increase in the amount depicted by the Prize Meter.

In one embodiment, after each question, round, or other game event, a price level or measure of performance may be shown to the player as increasing. For example, a user answers a question that is presented on a first screen of the controller's website. After the user has indicated his answer, a second screen may appear showing a meter indicating a price or value (e.g., a Prize Meter). The meter may consist of an area of a screen that displays the user's price level. The meter may display a price level numerically, with exemplary readings of "$0.35", or "4.32." FIG. 12 depicts an exemplary display of a meter indicating an amount or price, and is discussed further below. The price on the meter may then be shown increasing.

In some embodiments, above the meter, the controller may display a message indicating various information. Such information may include the user's performance in the prior round (e.g., "You got 2 out of 3 correct"), an indication of what is presently occurring (e.g., "your price level is now increasing"), the amount by which the price level is increasing, and so on. Visually, the displayed price may increase rapidly through a sequence of consecutive prices. For instance, "$0.00" becomes "$0.01," then "$0.02," then "$0.03," finally ending with "$2.23."

A meter or other indication of a player's game performance may be shown on a different screen from the screen in which the user plays the game. For example, after each question, round, or other event, the controller may display for the user a separate screen in which the price on the meter is shown increasing. Once a meter has been depicted as reaching its new value, for example, the controller may bring the user back to the screen in which the game is being played.

Of course, the meter may be shown in the same screen as the game. For example, the user may view questions in the lower portion of his screen, and may view the meter displayed in the upper portion of his screen. After, or during each game event, the user may watch as the price increases. For instance, after the user answers the first of three questions displayed on a screen, the user's earned credit amount may be shown increasing within the same screen.

In addition to, or instead of displaying a price using a meter, the controller may display a measure of game performance or other measure graphically. For example, the controller may display a thermometer with a target price indicated above the thermometer. The thermometer may contain a depiction of a mercury level representing the current price level. The ratio of the height of the mercury to the height of the thermometer may be (but need not be) made proportional to the ratio of the price level to the target price, for example. Other graphic depictions of a price level may include a dial with markings from zero to the target price, an hourglass where the level of sand is related to the current price level, and so on. Other types of graphic representations will be understood by those skilled in the art in light of the present disclosure.

In some embodiments of the present invention, the controller may determine a final measure of performance (e.g., a final Prize Meter amount or Price Tag value). For instance, the user may reach the end of a game after which there are no further game events. A final measure or score may be presented to the user, in any of various well-known ways. In one example, in a separate screen showing the final amount on a meter, the controller may display the message, "This is your final price level." In another example, the message may read more explicitly, "Your final price level is $9.45." In one or more embodiments, the controller may express the user's final amount in terms of a price gap or gap amount that is equal to the difference between a target price and a final value (or, alternatively, it may be equal to a final Price Tag value). For example, the controller may display the message, "Your price gap is $0.55. You only need to pay $0.55 to acquire each of up to three products."

In one or more embodiments featuring a pricing-themed game, a final Prize Meter Gap Amount or Price Tag value may be determined based on the customer's success in answering one or more price-oriented questions. The Prize Meter Gap Amount or Price Tag may then be displayed to the customer.

4. Merchant Information is Presented to the User

In step 908, merchant information is presented to the user. In some embodiments, as discussed herein, a server may be configured to present to a user (e.g., a game contestant) information about one or more products and/or one offer from one or more merchants. In some embodiments, as described herein, presenting information associated with a merchant may comprise presenting information about one or more products or services available at a merchant in a game (e.g., displaying a prize showcase, asking a question based on information about a merchant or a merchant's product). For example, information associated with a merchant, such as the merchant's name, location, and/or information about products or services the merchant offers, may be used as an element of a game.

In some embodiments, presenting such information may comprise providing a user with a prize and/or allowing a user to select at least one prize (e.g., product entitlement) associated with a merchant. According to some embodiments, presenting merchant information to a user may comprise determining what information to present. For example, in some embodiments, the entitlements from which the customer may be allowed to select a prize may be based on the Prize Meter Gap Amount, the Price Tag amount, the price level and/or the customer's degree of success in playing the game.

In accordance with some embodiments, presenting merchant information to a user may comprise determining whether to provide access to any entitlements (e.g., based on a user's performance in game). For example, after a player has finished playing a game (e.g., after four rounds of questions), the central controller evaluates the customer's performance and determines whether, and to what degree, the customer will be provided with retail entitlements. In another example, once a final price level or other measure of performance has been determined, the user may have an opportunity to select one or more products.

In some embodiments, prizes may be presented to users of a game system irrespective of their interaction with one or more component games (e.g., a contestant of a game show system who does not win or complete a game may still be presented with an offer). In other embodiments, a contestant may be presented with a prize based on her success playing a component game (e.g., a customer answers a question correctly and is then presented with an entitlement). In other embodiments, upon the completion of one or more component games, a customer may be presented with at least one prize from each of at least two merchants.

In one or more embodiments, the number of prizes a user may select may depend upon the user's game performance. For example, if the user has performed poorly, then the user may be allowed to select only one product. On the other hand, if the user has performed well, then the user may be allowed to select three products.

In one example of a Prize Meter embodiment, based on the Prize Meter Gap Amount and/or the user's degree of success in the game (e.g., in answering price-oriented questions), the controller may determine how many products the customer may be entitled to purchase for the Prize Meter Gap Amount. In one example of a Price Tag embodiment, based on the Price Tag amount and/or the user's degree of success in answering questions, the central controller may determine how many products the customer may be entitled to purchase for the Price Tag amount.

In some embodiments, a user may select or may otherwise be issued a certain number of prizes based on his success or failure playing one or more component games within a game session. For example, a user may be able to claim a certain number of prizes (e.g., "Pick your favorite 3 prizes!") that is determined based on the player's performance playing one or more component games (e.g., the customer successfully completed three of four component games). In other embodiments, a customer may accept more than one prize (e.g., a customer may select three prizes from a "showcase" of fifteen prizes).

In some embodiments, a user may be allowed to choose a subset of prizes presented to him, as discussed further herein. In one embodiment, a user may also have the opportunity to select a product for which the price level he has won will apply. For example, over the course of a game, the user may win a price level of $9.45. In one embodiment, the user may be presented with twenty-four product descriptions and may have the opportunity to select up to three of them.

In other embodiments, the number of prizes that a user may be eligible to choose may be predetermined and/or may be limited by the rules of the game, for example, to three products (e.g., as indicated in the presentation rules database 240).

A representation of any prizes made available for selection, and/or an indication of the number of prizes the customer may select, may be output to the customer in a prize selection screen. In some embodiments, the group of products from which a player may be able to select a prize and/or will play a game for may be referred to as a showcase, prize showcase, or product showcase. In at least one embodiment, available prize options may be presented in the form of a prize showcase (at the beginning of the game, during the game, or anytime), in which a plurality of prizes (e.g., represented by pictures or icons) are presented substantially simultaneously to a player. In one embodiment, the prize showcase is displayed after the contestant has completed playing at least one component game.

Figure 13:
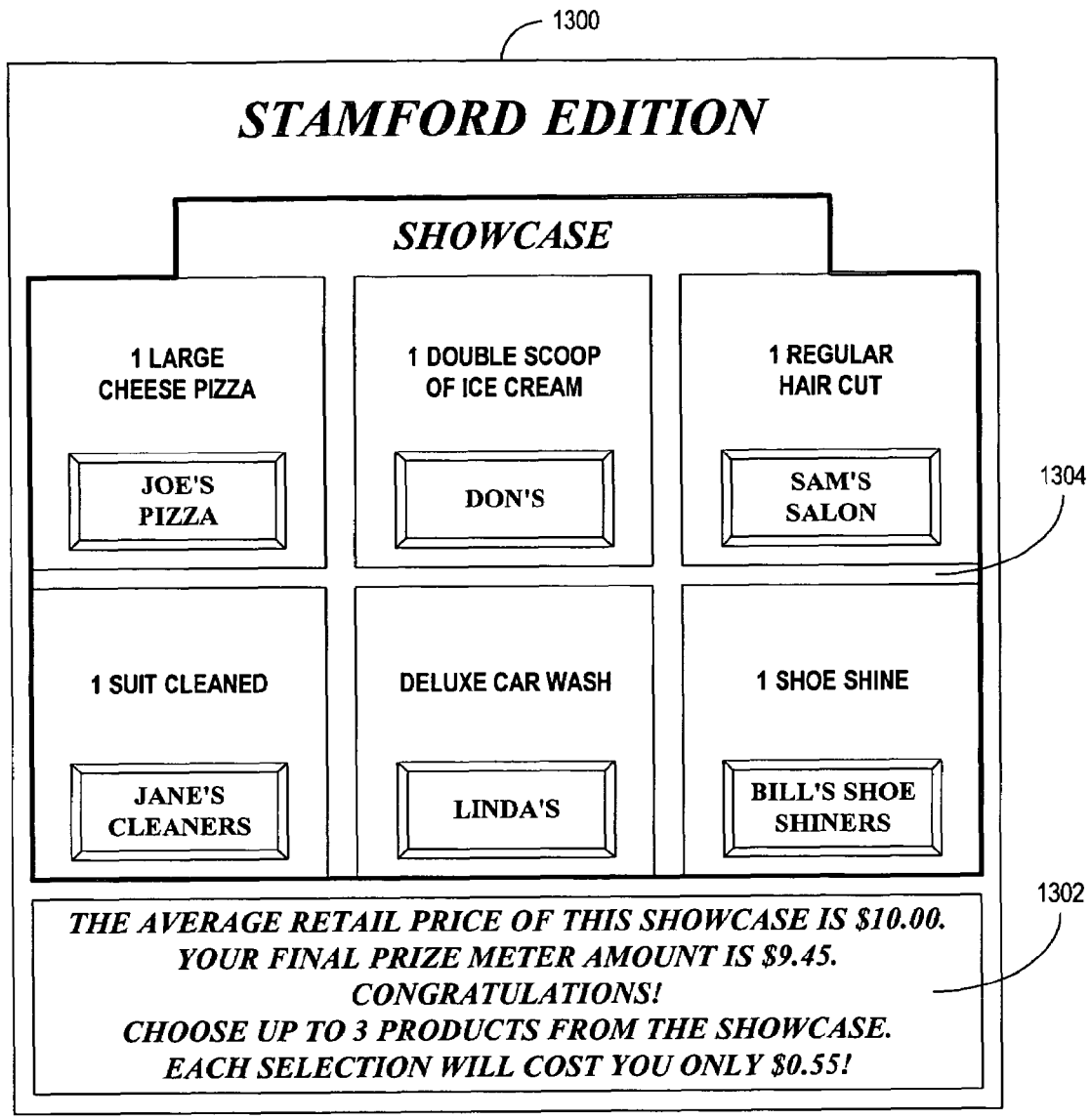
FIG. 13 depicts an example screen of a game according to some embodiments of the present invention.

FIG. 13 depicts an example game screen 1300 that may be used to prompt a game player to select one or more retail entitlements. The screen 1300 displays indications of a plurality of prizes 1304 (a "showcase") from which the player may select. A sample message 1302 communicates to the player that the player has earned a final amount of $9.45 (e.g., a final Prize Meter amount). In some embodiments, as discussed herein, the indicated final amount may be used in determining an amount to be charged the player for each entitlement issued. In this example, the average retail price of the showcase (e.g., a target price) is $10.00. The sample message 1302 also indicates that the player may receive up to three prizes in exchange for $0.55 per prize (i.e., the gap amount is $0.55).

In one or more embodiments, the user may have the opportunity to choose one or more products for which he will play or from which he will be able to select a prize. For example, prior to initiating game play, or at any time, the user may choose a category of products, such as "household items," "restaurant items," or "premium products." Based on the user's choice of category, the controller may determine one or more products that fall into the category. For example, in the category of "restaurant items," the controller may select a "large pizza at Tanya's Pizza", an "appetizer at Gordon's Diner", a "large drink at Linda's Café", and so on. It will be understood that a category of products may be defined by any number of attributes, such as the price of products within the category, the main use of products within the category (e.g., all products are used for gardening), the location at which the products may be purchased (e.g., all are from merchants within a particular geographic region), the audience to which products would appeal (e.g., products for a family with children), and so on. A category of products might even consist of "miscellaneous" products, with no particular relationship among them.

In one or more embodiments, the user himself may choose one or more indicated individual products that he will play for (i.e., that he may be or become eligible to select at the end of the game). In one or more other embodiments, a user may not have a choice as to a showcase or product category, or as to which products will be contained in a showcase. In one example, a controller may create a group of products that fall under a category. The group of products selected by the controller may then comprise the products for which the game will be played. In another example, the user may choose a product category, the controller may then present the user with products falling within the category, and the user may then select individual products from within the category in order to form a showcase.

In various embodiments, presenting merchant-related information may include one or more of: (i) receiving or otherwise determining at least two offers, (ii) determining a presentation rule, (iii) identifying at least one game condition (e.g., a measure of performance), and/or (iv) determining whether to present the first or second offer based on the presentation rule and the at least one game condition. For example, merchants may instruct that certain prizes be offered in accordance with different criteria (e.g., present prize MP-001 to a certain type of contestant, during a certain time of day, when prize LP-003 is also available for selection). Accordingly, in some embodiments (e.g., wherein one merchant may provide a plurality of offers), a system may employ a presentation process in which, based on stored presentation rules and game conditions, one or more particular offers from one or more merchants may be presented instead of other offers. Various types of presentment rules may be stored and/or referred to as deemed practicable, in accordance with some embodiments, to increase the overall acceptance rates of entitlements and to generate more traffic and sales at the retail locations of participating merchants.

In some embodiments, presenting merchant-related information includes communicating one or more of (i) written text describing an offer and/or offer terms; (ii) an icon, graphic and/or picture representing a product or service associated with the offer; and/or (iii) any other means of communicating a specific offer or other prize to a contestant, visually or otherwise. For example, the controller may present to the user a number of product images and product descriptions. Such images and descriptions may correspond to products for which the controller has obtained product guarantees or other entitlements. Additionally, as discussed herein, such images and descriptions may correspond to a group of products determined at the start of the game.

In some embodiments, as discussed herein, more than one entitlement may be presented substantially simultaneously to a contestant. For example, a contestant may be presented with a plurality of offers (e.g., a prize showcase contains fifteen prize offers supplied by local merchants) from which a contestant may claim a certain number of prizes (e.g., "Pick your favorite 3 prizes!"). In another example, a user may then be presented with twenty-four product images, representing such exemplary products as a large pizza at Joe's Pizza, a manicure at Hilda's Salon, or a dog grooming at Sam's Creature Care Center. Each product may correspond to a product described by a product guarantee or other entitlement.

5. An Entitlement is Provided to the User

In step 910, an entitlement is provided to the user. In some embodiments, an entitlement may be provided as a prize (e.g., in a game). In some embodiments, providing an entitlement may include determining whether a user accepts at least one retail entitlement. For example, upon being presented with one or more offers (e.g., via a display of a user device 104), a user may accept one or more offers. In some embodiments, providing an entitlement to a user comprises receiving an indication of a selection by a user of the entitlement.

If the customer has won a retail entitlement, for example, such as the ability to purchase a product for an amount equal to a Prize Meter Gap Amount or a Price Tag amount, the customer may be provided with the opportunity to accept the retail entitlement (e.g., by clicking on a corresponding image displayed on a website).

In various embodiments, a user may accept an entitlement by selecting (e.g., highlighting, clicking on, pressing an area of a touch screen, actuating a corresponding button or key, etc.) one or more of: (i) text, (ii) icons, graphics or symbols, and/or (iii) any representation, visual or otherwise, identifying a specific entitlement sponsored by a merchant. FIG. 13, discussed above, depicts an example game screen 1300 that may be used to prompt a game player to select one or more prizes.

In some embodiments, as discussed herein, a player may accept a finite number of entitlements after completing a game session. In other embodiments, a player may win one or more prizes (e.g., after playing a game show), and choose not to accept or select prizes until a later time (e.g., a return visit to the game show website). Also, in some embodiments, providing an entitlement may not include any active acceptance by a player of a particular prize. For example, a visitor to an online game show website may automatically "win" a medium pizza from a local merchant.

In one or more embodiments, the user need not select any entitlements or other prizes. For instance, the user may not desire to obtain any of the products displayed for him, even though he may be able to do so for well below the products' typical retail prices. In such cases, the user may be given the opportunity to select from another group of products and/or to replay the game. In some embodiments, a customer's rejection of the at least one retail entitlement results in the start of a new game. Thus, although a user may potentially accept at least one retail entitlement, the customer may also reject the at least one retail entitlement.

Should a user accept at least one embodiment, providing the entitlement may further comprise determining whether the customer is a first-time player or a repeat visitor to the website. For example, the controller may consult a player database 220 to determine if the user has previously played an online game before, which would indicate that the player is a repeat visitor. If the customer is a first-time player, this step may further comprise requesting and receiving the customer's contact information (e.g., full name, address, phone number, etc.) and/or financial account information (e.g., credit card account number). Of course, as discussed herein, such information may be requested and/or received prior to the start of a game or at any time.

According to some embodiments, a user may provide a payment in exchange for a product, offer, entitlement, or other prize. In some embodiments, a prize may include the opportunity to purchase something. For example, a user may pay for one or more selected products based on a price level he has achieved or a credit amount he has earned. In another example, based on a Prize Meter Gap Amount and/or a user's degree of success in answering price-oriented questions, the user may be entitled to purchase one or more products for the Prize Meter Gap Amount. In an example of a Price Tag embodiment, based on the Price Tag amount and/or the user's degree of success in answering price-oriented questions, the user may be entitled to purchase one or more products for the Price Tag amount. If the user has won an entitlement such as the ability to purchase a product for an amount equal to a Prize Meter Gap Amount or a Price Tag amount, the user may be provided with the opportunity to accept the retail entitlement.

In some embodiments featuring pricing-themed games, the operator of the controller may desire to provide first-time customers with the ability to receive one or more retail entitlements for free. In the case of a Prize Meter embodiment, for example, the controller may be configured to waive charging first-time customers any amount whatsoever, including (1) a game entry fee, or (2) a Prize Meter Gap Amount. Otherwise, for repeat customers, the controller may be configured to charge (1) a game entry fee (e.g., $0.25 per game) and/or (2) a Prize Meter Gap Amount. In the case of a Price Tag embodiment, the controller may be configured to waive charging first-time customers any amount whatsoever, including (1) a game entry fee, or (2) an amount based on the customer's final Price Tag. Otherwise, for repeat customers, the controller may be configured to charge (1) a game entry fee (e.g., $0.25 per game), and/or (2) an amount based on the customer's final Price Tag, such as an amount equal to the final Price Tag amount multiplied by the number of products selected from a prize selection screen (e.g., sample game screen 1300).

It should be noted that in embodiments where customers are required to pay the controller (e.g., with a credit card account or account established with the controller) a Price Tag amount or gap amount in order to realize retail entitlements, the controller may be configured to request a supplemental, affirmative authorization from the customer to charge the customer's account.

In one example of a Prize Meter embodiment, a customer may determine that the final Prize Meter Gap Amount is too high (i.e., it would cost too much to purchase an entitlement), and may choose to start the game process over again. Further, in such instances, a fee may be optionally charged for each new game started (e.g., $0.25).

According to some embodiments, a user may purchase one or more products by making up the gap between a credit amount (or a price level) and a target price. Once the user has chosen a subset of products (e.g., from a showcase), the user may pay for the chosen products based on the credit amount he has accumulated. Thus, in some embodiments, to obtain a right to an entitlement, a user need then only pay the difference between the credit amount he has achieved and a determined price (e.g., a target price, a retail price of the product corresponding to the entitlement). Once the user has selected one or more entitlements, the user may be charged for the entitlements. The credit amount a user earns toward an entitlement may typically be close to the retail price of the product, so that there is only a small gap for the user to make up using his own funds. Accordingly, it is generally beneficial for a user to win a higher credit amount for a product, as then there will be a smaller gap that he must pay out of his own pocket. Equivalently, it is generally beneficial for the user to achieve a small gap, which in some embodiments may be represented as a declining value (e.g., a Price Tag amount).

Providing an entitlement to a user may comprise determining a price to charge the user for one or more entitlements. In some embodiments, after the one or more products have been determined as part of the game and/or for selection as prizes by the user, the controller may determine a target price. During a game, the user may attempt to get a price level or credit amount as close as possible to a target price. If the user can get his price level to match the target price, for example, then the user may be able to obtain one or more products without further financial outlay (i.e., for free).

In one embodiment, the target price may be determined based upon the retail prices of the products for which the user is playing. The target price may be based on, for example:

a) The average (mean, median or mode) of the retail prices of the products
b) The highest of the retail prices of the products
c) The lowest of the retail prices of the products
d) The weighted average of the retail prices of the products.

It will be understood that the weighting of retail prices may be done in a number of ways. In one example, the retail price of a particular product is weighted based on the frequency with which users have chosen it for acquisition in the past. For instance, suppose a user is playing for a group of products comprising products A, B, and C. At the end of the game, the user will be able to choose one of the group of products to acquire. Suppose further that product A has a retail price of $10.00, product B has a retail price of $5.00, and product C has a retail price of $9.00. Further, suppose that products A and B have been chosen with about equal frequency in the past, while product C has been chosen twice as often as products A or B. Therefore, the retail price of product C may receive twice the weighting of the retail prices of products A and B when figuring the target price. Thus, in this example, the target price may be equal to: (retail price of A+retail price of B+2×retail price of C)/4, which equals $10.00+$5.00+2× $9.00)/4, which equals $8.25. Of course, there are many other criteria with which the weightings for an average may be derived.

It should be noted that the target price might be determined based on other prices or measures of value for the products for which the user is playing. For example, the target price of a product may be based upon the price the controller paid for a corresponding product guarantee, the manufacturing cost of the product, the price suggested for the product by a merchant (e.g., by the merchant supplying the product), the liquidation value of the product, and so on. The controller may also determine a target price based on other additional or alternative factors. Such factors may include, without limitation:

a) The category label, or the showcase label. For example, if a category is labeled "premium products," then the target price may be relatively high, even though the products themselves do not necessarily have high retail prices.

b) The geographic location of the user. In various embodiments, the controller may wish to discourage play from users who live far from merchants providing product guarantees. Such users might be less likely to become regular customers of the merchants. Therefore, in one or more embodiments, a target price is made relatively higher for a user whose residence is geographically distant from the location of one or more merchants providing product guarantees for the products in a game.

c) Chance. A controller may select a target price at random. The target price may, for example, take on a random value within a predetermined range, such as $8.00 to $12.00.

d) History. The controller may, for example, select a target price for a showcase because the target price has applied to similar showcases in the past.

In at least one embodiment, if a user's price level falls short of the target price, then the user may have to make up the gap with his own funds. In some embodiments, this gap refers to the difference between the price level won by the user and the retail price of the product. For example, if the target price is $9.50, and the user achieves a price level of $9.10 through play of the game, then the user may have to make up the gap of $0.40 with his own funds if he wishes to obtain a product. To obtain two products, the user may have to use $0.80 from his own funds, and so forth.

In another example, for each selected product, the amount the user is charged may be equal to the difference between the target price and the price level the user won during play of the game. For instance, if the user has won a price level of $8.55, if the target price is $10.00, and if the user has chosen three products, then the user may be charged 3×($10.00−$8.55), or $4.35. The user may, in some embodiments, be charged an additional amount for other costs, such as shipping costs for the product or for a certificate redeemable for the product (e.g., if the product or certificate is mailed to the user by the controller).

In some embodiments, the user may be considered to be purchasing the means to obtain a product (as opposed to purchasing the product itself from the controller). Since the controller may have obtained product guarantees, for example, the controller may be able to provide the user with the means for obtaining a product (e.g., a certificate corresponding to the guarantee). The user may then obtain the product from an appropriate merchant.

In some cases, the game may be configured such that a user may be able to achieve a price level equal to the retail price of a product, in which case he would not have to pay anything for the chosen products—the gap amount would be zero.

In some embodiments, providing one or more entitlements to a user may include receiving payment or an indication of payment by a user. For example, the user may possess an account with the controller. The account may contain an amount of funds provided by the controller (or a third party) to the user for free (e.g., as a benefit to first-time users). Alternatively, the user's account may have been established or funded with funds from the user's credit card account. For instance, the user's credit card account may have been charged $5.00 in order to fund an account maintained with the controller. Once the user has agreed to purchase one or more products, the amount of the gap between the target price and the final price level may be deducted from the user's account with the controller. If the user has insufficient funds in his account, in some embodiments the user may be required to add additional funds (e.g., from a credit card account).

In some embodiments, the user may not have an account associated with the controller. In one or more such embodiments, the user's credit card account may be charged directly for any amount required to obtain one or more entitlements (e.g., based on the gap between a target price and a price level earned by the player).

In one or more embodiments, providing an entitlement to a user comprises providing the user with means to obtain a product (e.g., corresponding to a product guarantee). In some embodiments, if the user has accepted at least one retail entitlement, the controller the retail entitlement to the user. This may include providing retail entitlement data to the user (e.g., including information about a product, a merchant, a merchant location, etc.) and/or recording the distribution of the retail entitlements. Thus, in some embodiments, once the user has purchased a right to receive a product, the controller may provide the user with the means to obtain that product.

In one or more embodiments, the user may obtain the product by bringing an appropriate certificate to the merchant providing the product. Providing an entitlement to a user may thus include providing a certificate or other means to obtain a product. In one example, a certificate might contain, among other things, the user's name, a description of the product for which the certificate is redeemable, the name of the merchant who will provide the product, a date on which the certificate was issued, a date by which the certificate must be redeemed, and one or more designs that are difficult to forge.

In some embodiments, the controller may provide a player with a retail entitlement by allowing the player to download a printable voucher that can be presented by the player to a retailer in a redemption process. For example, once a user has paid for one or more product guarantees, the controller may transmit to the user one or more printable certificates. In one embodiment, the controller transmits one certificate for each entitlement for which the user has paid. The user may then print the printable certificates from a user device (e.g., using a printing device). The controller may transmit a certificate to a user in electronic form. For example, the controller may transmit the certificate as a PDF (portable document format) file.

In one or more embodiments, the electronic file to be printed as the certificate is not displayed directly on the user's terminal screen. The electronic file may be set up in this way, for example, in order to discourage screen-capturing of the certificate. For instance, if the user were able to screen-capture the certificate, the user might duplicate the certificate electronically and send electronic versions of the certificate to friends. Since the friends would thereby obtain certificates without paying, and since there might now be more certificates outstanding than were intended by the controller, the re-transmission of certificates could be a misuse of the system.

In one or more embodiments, the controller may mail to the user a copy of a certificate or entitlement data via postal mail. Postal mail might be used, for example, if the user has no printer.

In other embodiments, the controller may allow the player to download a code that identifies a prize into a PDA, cell phone, or other portable device. In some embodiments, a game may be played on a user device (e.g., a PDA) in order to "unlock" any codes stored in the device. For example, a player's PDA may unlock one or more stored prize codes (e.g., reveal them to the player) based on the player's performance in a game.

In some embodiments, the player could transmit a prize code to a device operated by the retailer upon redemption. In yet another embodiment, the controller may merely output a message to the customer indicating that an entitlement is registered in his or her name.

For each issued entitlement, the controller may create or update a record in a database to reflect the issuance (e.g., an issued prize database 235 and/or a prize database 230). In some embodiments, once a customer accepts one or more prizes, a record (e.g., in prize database 230) may be updated so as to reflect the removal of one or more prize units. This step may be particularly useful in embodiments where participating merchants wish to limit the availability of retail entitlements. For example, the number available of a particular prize may be adjusted in the prize database 230. Maintaining and tracking the issuance of prizes may be desirable so that, once a given retail entitlement has been exhausted (i.e. once a numerical limit has been reached), related products are not included as game elements or offered as prizes in any subsequent games.

In various embodiments, acceptance data may be recorded (e.g., in an issued prize database) to reflect a customer's selection of a prize. In some embodiments, acceptance data may include an indication of: (i) the offer that was accepted, (ii) the user that selected the offer (e.g., user data, which may include demographic information), (iii) the status of certain game elements when the offer was selected (e.g., game conditions), and/or (iv) general game system statistics. Additionally, in some embodiments, acceptance data may be sequentially updated to include information concerning the redemption of awarded prizes (e.g., a customer's behavior subsequent to accepting a prize, such as whether or not a prize voucher is then presented and redeemed at a merchant retail location).

6. A Request to Validate an Entitlement is Received

In step 912, a request to validate an entitlement is received. In some embodiments a user provides a certificate to a merchant sponsoring a corresponding entitlement.

In some embodiments, the controller may receive a request to validate an attempt by a user to redeem a retail entitlement, and may determine the validity of the retail entitlement. For example, after at least one retail entitlement has been distributed to a customer, a retailer may transmit retail entitlement data to the controller to validate the retail entitlement. A retailer may seek such validation of a retail entitlement when a customer attempts to redeem a product from the merchant by claiming that they are entitled to receive the product (e.g., after having played an online game). For instance, a customer may present a product to a cashier at a retail store and tell the cashier that she is entitled to receive the product as a result of her playing an online game. The cashier may, in turn, manipulate a merchant device such as a personal computer, a validator device or a card authorization terminal to transmit an authorization or validation inquiry to the controller.

Such an inquiry may include, without limitation, (a) an entitlement identifier, such as an alphanumeric voucher identifier or prize code (e.g., that may match or be used to determine a prize identifier 602); (b) a unique identifier of the customer, such as a full name, Social Security Number, financial account number (e.g., credit card number, checking account number), promotional account number (e.g., loyalty card number), or the like; and/or (c) a description of the product the customer claims she is entitled to receive (e.g., a Universal Product Code, or the like).

After receiving a request, the central controller may consult a database (e.g., an issued prize database 235) to confirm that the customer was issued an appropriate retail entitlement. If the controller determines that the customer is registered to receive the product, the central controller may (1) transmit an authorization message to the cashier, who may authorize the transaction such that the customer need not provide payment to the retailer for the product; and/or (2) update a database record to reflect the redemption (e.g., in the issued prize database 235).

Thus, if a customer has won the product and/or purchased it in conjunction with an online game, in some embodiments she need not provide any payment to the retailer in order to acquire the product. In some embodiments, an operator of the central controller may credit the retailer for any such redeemed products.

In an alternate embodiment, a retailer may maintain an independent database or log of retail entitlement identifiers that can be consulted without submitting an inquiry to the controller. Such information may be provided to the retailer by the controller, for example, from time to time. When a customer wishes to redeem a retail entitlement, the validity of the retail entitlement can be verified against the retailer's local information, eliminating the need to communicate (e.g., via a network) with the controller in order to validate that entitlement. Of course, the retailer may at some point indicate to the controller that the entitlement has been redeemed.

In one example, a user may have purchased an entitlement after playing an online game. In another example, with a printed certificate in hand, a user may visit the merchant who is to provide a product the user has purchased a right to (e.g., from the controller). The user may hand the certificate to the merchant and may receive the prize from the merchant in exchange for the certificate.

Figure 10:
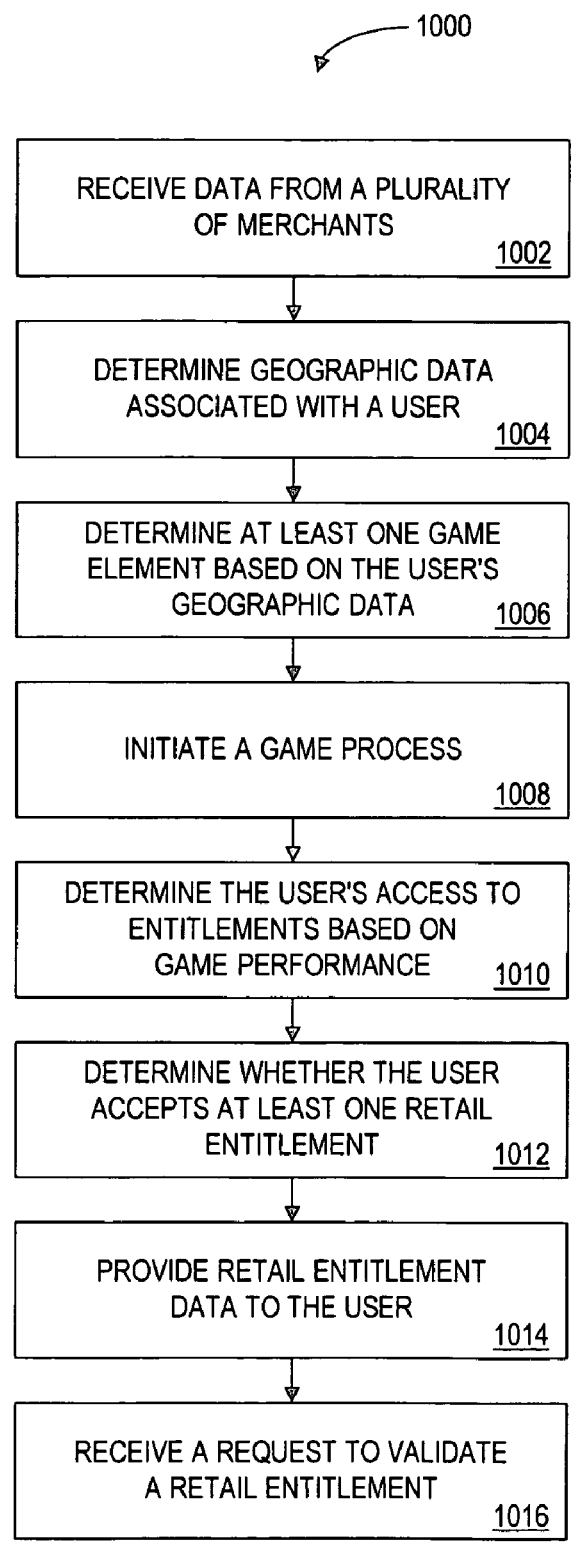
FIG. 10 is a flow chart illustrating an example process according to some embodiments of the present invention.

Referring to FIG. 10, a flow chart 1000 is depicted that represents some embodiments of the present invention. Although the method 1000 is discussed as being performed by a controller, it will be understood in light of the present disclosure that various aspects of the exemplary method may be performed by a controller, a game server, a user device, a retailer device, or any combination of the devices and/or computers described herein.

In step 1002, data is received from a plurality of retail merchants. For example, merchants register via a website or otherwise communicate information to the controller. Various examples of merchant-related information are described in this disclosure and might include geographic data, product offerings (e.g., a dinner menu), promotional information (e.g., "We've been satisfying Stamford customers since 1983"), and one or more prizes each merchant is willing to provide to the system (e.g., "Large cheese pizza"). In step 1004, geographic data associated with a user is determined. For example, a visitor to an online game website may indicate a preference for a local edition of a game or might indicate a street address when registering with a central controller. In step 1006, at least one game element is determined based on the geographic data associated with the user and the data received from at least one merchant. For example, a controller may identify a particular game file associated with a local edition of a game. In another example, the controller may generate game questions that are based on information about merchants and/or products available in the user's geographic data. In another example, the controller may determine a prize showcase including prizes sponsored by local merchants (e.g., merchants identified based on the user's indicated geographic area). In step 1008, a game process is initiated. Various aspects of providing play of a game are described in this disclosure, and other examples will be readily apparent to those skilled in the art in light this disclosure. In step 1010, the user's access to retail entitlements is determined based on the user's performance in the game. For example, a measure of performance may be determined and tracked during play of the game (e.g., based on various factors discussed in the disclosure). In another example, the user may be required to achieve a minimum game performance before being permitted access to any entitlements. In step 1012, the controller determines whether the user accepts at least one entitlement. For example, as discussed herein, the user may be presented with a prize selection screen and may indicate (e.g., using a mouse) one or more entitlements he would like to receive. In another example, a user may indicate permission to charge an account for any amount due for an entitlement accepted by the user. In step 1014, retail entitlement data is provided to the user if the user has accepted at least one entitlement and (optionally) a record of the issuance of the retail entitlement is recorded. For example, the user may receive a file for use in printing a voucher and/or may receive a code that identifies the issued entitlement(s). In step 1016, a request to validate a retail entitlement is received from a merchant and the validity of the retail entitlement of is determined. For example, a retailer may send a voucher identifier to the controller in order to determine whether a customer presenting a voucher is entitled to receive a product (e.g., for free).

E. Additional Examples

The following examples illustrate some additional embodiments of the present invention in which a user is able to play a game and earn a price level. The following examples are provided merely to illustrate some aspects of the present invention, and should not be construed as limiting the scope of the invention in any way. Various other embodiments and examples of embodiments are discussed herein, and others will be apparent to those skilled in the art in light of the present disclosure.

According to an example scenario, Susan used her home computer to log onto an online game show website called "The Price is Right™ Online." She had heard about the website from a friend. Her friend had told her that The Price is Right Online is where people can participate in an online game show in order to win prizes for low prices, typically for less than a dollar. Susan registered for the website by providing her name, address, email address, and credit card number. As a first time user, she was provided with a free $5.00 credit to an account established with The Price is Right Online. After reading through some brief instructions, Susan elected to begin play of the game. Her account was charged $0.25 for the game, leaving her with $4.75.

Before beginning play of the game, Susan was instructed to choose a product showcase. The product showcase would contain twenty-four products or services for which Susan would play the game. Each of the twenty-four products would be from merchants in Susan's local area. Several showcase descriptions were listed, including a "General Showcase," a "Dining Showcase," a "Premium Showcase," and a "Household Products" showcase. Each showcase had an associated target price, which indicated the average retail price of all of the products within the showcase. Susan chose the General Showcase, which had a target price of $10.00.

At the beginning of the game, a meter was displayed on Susan's screen. The meter consisted of a box on her screen showing numerals displayed to indicate a price. The meter now showed a starting credit amount or price level of $0.00. Beside the meter was a graphic depiction of a thermometer. At the top of the thermometer was printed the target price of $10.00. Currently, there was no mercury in the thermometer.

The game consisted of four multiple-choice questions. Each question related to the prices of products or services from Susan's chosen showcase. After showing Susan the meter, a new screen displayed the first question. The question read, "Which three of the following six products have the highest retail prices?" Six product images and corresponding text descriptions were displayed below the question.

Susan clicked on three of the products, and then clicked on a "submit answer" button. The screen on her computer then changed to show her a message, "Congratulations, all your answers were correct." Below the message, her price meter was displayed prominently. The price level displayed started at $0.00, but then started increasing rapidly until it reached $2.05. Beside the image of the price meter was a thermometer. As the price level increased, the mercury in the thermometer was shown to increase proportionally. The thermometer was now approximately 20% full.

A new screen appeared with another question and more products. "Which one of the following six products has the lowest retail price?" Susan again selected an answer and again was taken to screen with her price meter. She had gotten the correct answer, so her price level increased from $2.05 to $4.10. The next question was "Which three of the following six products have the lowest retail prices?" Susan clicked on three answers and was again taken to the screen with her price meter. This time, the message read, "Congratulations, two of your three answers were correct." The screen also showed the six possible answer choices from the question, with the proper choices highlighted. Susan's price level now increased from $4.10 to $6.50. The level of mercury in her thermometer also increased proportionally.

On Susan's final question, she selected two of three correct answers. Susan's price level now increased from $6.50 to a final price level of $8.80. The mercury in her thermometer again increased. The thermometer was now almost 90% full. A new screen then displayed the message, "Congratulations, you have won a price level of $8.80. This leaves you with a gap of only $1.20 between your price level and the average retail price of the products below. You may now select up to three of the following 24 products to purchase. You may purchase each by paying only $1.20. You have already won the remainder of the purchase price!" Under the message were graphic illustrations and short text descriptions of twenty-four products. Among the products were pizzas, appetizers, entrees, and desserts at local restaurants, car washes, haircuts, oil changes, manicures, dry cleanings, and more. Susan noticed that all of the products presented were products she had been asked about during the game.

Susan selected three of the products by clicking on their respective images. Her account was charged $3.60 (3×$1.20), leaving her with $1.15. Susan's screen then displayed a message, "Thank you for playing. To obtain your products just click on the 'print' button below. Your printer will print out three certificates, one for each product you purchased. Just bring each certificate to the indicated local merchant in order to receive your product."

Susan clicked on the print button, and her printer printed out the three certificates. Susan took each certificate to the local merchant offering the corresponding product. At each merchant's store, she was able to exchange a certificate for one of her products. Also, once at the stores, Susan was able to learn more about what types of other products and services were available. At one store, much to the merchant's satisfaction, Susan made several purchases in addition to redeeming her certificate.

According to another example process, in one step at least one product for which a user will play is determined. For example, a set of products may be determined based on a location indicated by a user, based on one or more presentation rules, based on the preferences of one or more merchants and/or the controller, and/or based on a preference indicated by a user. According to the example process, a target price is also determined (e.g., based on an average retail price of one or more products). Play of a game is also initiated. For example, a game server may present game instructions or provide a first game even (e.g., a question related to a product offered by a merchant). Continuing with the example process, a price level is adjusted based on play of the game. For example, a player's price level is increased from $2.25 to $3.78 based on the player's answering two of three questions correctly. A final price level is then communicated to a user. For example, a price meter depicting the price level achieved at the end of a game session is displayed to a player. At least one product is also determined. For example, a showcase of products may be determined for use in a game and/or for presentation to a user for selecting one or more prizes. Further, the user is charged for at least one product. For example, as discussed herein, a gap price may be determined based on a credit amount earned by a player and/or a retail value of a product. An amount may be deducted from a user's account, for example. The user is also provided with means to obtain the at least one purchased product (e.g., a certificate, a prize code, redemption information). Additional examples consistent with at least some of these steps are discussed in this disclosure.

F. Additional Embodiments

According to some Prize Meter embodiments, a player's success in answering price-oriented questions may be communicated on a visual Prize Meter that is divided into "color zones." The Prize Meter is adjusted after each "round" (e.g., a question and answer set) based on the player's success in answering questions. In order to make it to the next round, the player must surpass a certain threshold or color zone on the Prize Meter. For example, a player must answer a question with a sufficient level of accuracy or correctness in order to advance the Prize Meter from a first yellow zone to a second green zone. The visual color zones thus create a notion of entitlement to get to the next level. Ultimately, players may be required to achieve a certain level or color zone in order to be eligible for retail entitlements.

Alternatively or additionally, game elements may be based on data other than geographic data associated with the user. In some embodiments, for example, the determination of which game elements to incorporate into a game (e.g., which products go in a prize showcase) may be based on customer history data. For instance, customer history data may be considered in a game configuration process. In this way, customers may be prevented from playing for products they have previously won within a certain time period (e.g., within the last week). Such conditions, of course, might be incorporated as a presentation rule.

In some embodiments, the determination of which game elements to incorporate into a game (e.g., which products go in a showcase) may be based on a real-time assessment of a retailer's inventory or sales data. For example, if a given item is set to expire in the near future, it may be included as a game element in an effort to increase demand for the item.

In an alternate embodiment, players may customize game elements so that merchant and product data utilized in a game reflects the player's individual input about which merchants are geographically appropriate. Thus, a player may customize a game so that merchants along the route he commutes to work may provide the prizes.

In some embodiments of the present invention, the number of players allowed to play a particular version or edition of a game (e.g., during a particular period of time) may be limited. For example, the "Stamford edition" may be limited to one hundred fifty players per day. Thus, when a player selects a geographic area from a menu of options, for example, the controller may be configured to consult a database and determine if the limit has been surpassed. If the limit has been surpassed, a player may be barred from playing the selected edition at that time. Periodically (e.g., at the end of each day), the controller could begin a new count.

Further, in some embodiments, particular players may be prevented from playing certain editions more than a certain number of times (e.g., within a given period). For example, the controller would record (e.g., in the player database 220, in a customer history database) the occurrence of each player's game session. Upon each subsequent attempt by the player to play the same edition, such a record would be consulted and the number of times the player has already played that edition would be compared against a numerical limit rule. Periodically (e.g., at the end of each day), the controller could begin a new count. Players who are prevented from playing certain editions (e.g., because a numerical limit has been surpassed) may be encouraged in some embodiments to play an alternate edition of a game (e.g., a game featuring merchants and products from a neighboring geographic region).

In some embodiments, certain players who would otherwise be prevented from playing certain editions (e.g., because a numerical limit has been surpassed) may bypass or otherwise circumvent the numerical limit rule. For example, certain players may be deemed to have a certain status (e.g., "VIP" players) based on information about the player (e.g., past patronage, prior level of success in answering price-oriented questions) and may accordingly be granted the ability to play certain editions regardless of the numerical limit rule. Thus, some embodiments may include determining a status of a user.

In some embodiments, a website hosting geographically-segmented or geographically-configured games may be rendered to indicate the "high scorers" in one or more geographic regions (e.g., in a displayed list of the ten top-ranked players).

In an alternate embodiment, a retail entitlement may include a discount redeemable at a retail merchant. Thus, in such an embodiment, a player might not pay the controller a price corresponding with a product offered by a retail merchant, but may instead pay the retail merchant for the product directly, at a price reflecting a discount permitted by the retail entitlement. In some embodiments, the opportunity to purchase the product at the discounted price from the merchant is a prize (e.g., for playing a game).

Some embodiments of the present invention include a method for determining whether a location associated with a user is in the same geographic region as at least one merchant. Such a method may also include determining whether a number of promotions that have been distributed (e.g., for the at least one merchant) is less than a predetermined maximum number (e.g., a number of prize units sponsored by or provided to the controller by a merchant). If the number of promotions distributed is less than the predetermined maximum number, the controller makes the user eligible to receive a promotion (e.g., a discount). If, on the other hand, the location of the user is not in the region, and the number of promotions that have been distributed is less than the predetermined maximum number, the user may be prompted to confirm that the user intends to redeem the promotion (e.g., intends to travel to the merchant's location to obtain associated product). In this way, a system may be able to confirm the willingness and/or intention of non-local prospective customers to participate in promotions associated with local retail merchants. Thus, the effectiveness of a given discount promotion may be improved by obtaining an affirmative confirmation from non-local prospective customers as to their willingness and/or intention to participate in (e.g., redeem) a given promotional discount or entitlement.

In some alternative embodiments, a method is provided in which a controller determines whether a user is a non-local user, and if the user is a non-local user, transmits a request for confirmation of the user's intention to travel to redeem a promotion (e.g., an entitlement, a discount). The method may also include receiving an indication of the user's intention to travel to redeem a discount promotion, and after receiving the indication, transmitting an indication of a voucher to the user.

As discussed herein, according to some embodiments a controller may be configured to receive data from a user device including the user's geographical location. For example, a user may transmit her ZIP code to the controller through her user device. The controller then identifies a geographical location associated with at least one participating retail merchant. Such geographical data may be retrieved from a database (e.g., a merchant database 225). Then, a determination is made, based on one or more stored rules, as to whether the user's geographical location is within a predefined distance from the at least one participating retail merchant's geographical location. In one example, a determination is made as to whether the retailer and the customer are within the same geographical region. If the two locations are within a predefined distance (e.g., if they are within the same geographical region), the controller queries a database (e.g., a prize database 230) to determine if a numerical limit associated with a discount promotion has been surpassed (e.g., if the number of available units has reached zero). For example, in a situation where promotional entitlements are to be given out to only a limited number of customers, the controller may query a database to determine if the limit has been reached. If the numerical limit has not been surpassed, the controller provides the (local) user with the opportunity to participate in a discount promotion with the at least one retail merchant. For example, the controller may allow the user to download and print a voucher that may be presented to a retailer. If the two locations are not within a predefined distance, the controller queries a database to determine if a numerical limit associated with a discount promotion has been surpassed (i.e. in a limited-participation promotion, that the limit has not been surpassed). If the numerical limit has not been surpassed, the controller outputs a prompt signal, such as a coded HTML Web page, to the (non-local) user. The content of the prompt signal may serve to ask the user to confirm his or her willingness and/or intention to participate in the redemption of a discount promotion. If the user so confirms (e.g., by transmitting a signal so indicating though his or her user device), the controller provides the user with the opportunity to participate in a discount promotion with the at least one retail merchant.

In one example scenario, Bob, a consumer living in County B, logs on to a website configured to distribute entitlements to promotional discounts on behalf of retail merchants from various geographical regions. More particularly, the website provides consumers with the ability to play games and win vouchers good for discounted or free merchandise at participating retailers. After playing the game, it is determined that Bob has won a voucher good for a sandwich at Mary's Fast Food Restaurant, located in County A. However, before providing Bob with the ability to download the voucher, the controller consults a database to confirm that not more than a limited number of vouchers have been issued (e.g., that not more than one hundred vouchers have been issued if Mary's Fast Food Restaurant does not wish to distribute more than one hundred vouchers).

The controller then determines, based on one or more stored rules, that Mary's Fast Food Restaurant prefers to issue such vouchers to prospective customers who reside in County A, and only wishes to issue such vouchers to residents of County B if they confirm their intention to redeem the vouchers. Accordingly, because Bob is a non-local resident of County B, he is presented with a confirmation screen that includes the message: "Bob, are you sure that you intend to travel to County A to pick up your sandwich at Mary's Fast Food Restaurant?" After clicking on a button marked "Yes," the website displays a voucher screen to Bob that includes a voucher identifier. Bob prints the voucher and stores it in his wallet, anticipating his trip to County A. When Bob visits Mary's Fast Food Restaurant, a clerk there confirms the validity of the voucher by either checking the voucher identifier against a printed list or against a local or remote database.

In some embodiments, a non-local user may be ineligible to receive an entitlement from a merchant (e.g., if the merchant is in a different region). For example, if a location associated with a user and a location associated with at least one merchant are not within a predefined distance (or if the numerical limit associated with the discount promotion has been surpassed), in some embodiments the controller may prevent the user from participating in a discount promotion with the at least one retail merchant. The controller might provide the user with the ability to participate in an alternative promotion (e.g., a manufacturer-sponsored promotion that is not specific to a certain retailer). In this manner, limited discount promotions may be reserved exclusively for prospective local customers. Additionally, if the prospective customer is local and limited-participation promotions associated with local retailers are exhausted, or if the prospective customer is non-local, the prospective customer might be provided with the ability to participate in alternative promotions, such as manufacturer-sponsored promotions that are not specific to local retailers.

In one example, John, a resident of County B, logs on to a website which provides consumers with the ability to play games and win vouchers good for discounted or free merchandise at participating retailers. Although there are no participating merchants willing to provide promotional entitlements to residents of County B, John is allowed to play games on the website and possibly win alternative promotional entitlements, such as manufacturer coupons for national brand products.

In some other embodiments of the present invention, if a location associated with a user and a location associated with at least one merchant are not within a predefined distance (i.e., the user is non-local), the controller may identify a second numerical limit associated with a discount promotion that is based on the likelihood of non-local customers redeeming promotional entitlements associated with local merchants. If the second numerical limit for the given promotion has not been surpassed, the controller provides the (non-local) user with the opportunity to participate in the discount promotion with the at least one retail merchant. In this manner, entitlements to discount promotions at local retailers can be overbooked with issuances to non-local customers. This allows for the likely event that fewer than all non-local customers will ultimately redeem promotional entitlements.

In one example, Retailer Y may have previously registered with a central website to provide a limited number of promotional entitlements to non-local customers. In this example, the number of entitlements is based in part on the rate at which non-local customers are expected to redeem such entitlements. For instance, if it is expected that only 80% of non-local prospective customers will redeem issued promotions, Retailer Y may wish to overbook issuances of promotional entitlements to non-local prospective customers by issuing 120% of the number of entitlements that Retailer Y actually would prefer to honor. In this way, Sara, a resident of County B, might log on to the central website, play a game, and might win a promotional entitlement to Retailer Y in County A, despite Sara's residence in County B.

In some embodiments, non-local customers may be permitted to receive promotional entitlements, but may be required to register a default customer (e.g., relative) that will receive (e.g., via email) the promotional entitlement if the first non-local customer does not redeem the entitlement with a certain amount of time.

In other embodiments, non-local customers may be permitted to receive promotional entitlements, and may be given the option of forfeiting such promotional entitlements if it subsequently becomes apparent that they will not be able to redeem the entitlement at the relevant local retailer. Forfeiture may in turn entitle the non-local customer to a cash refund (e.g., 80% of the value of the initial promotional entitlement) or other value.

In some embodiments, non-local customers may be issued promotional entitlements only if they agree to pay a penalty in the event that they do not redeem the entitlement within a certain amount of time. Further, such penalties may be directly charged to a financial account associated with the non-local customer (e.g., a credit card account).

In some embodiments, the local/non-local determination may occur based on rules established by the merchants. For example, Merchant A may wish to define local customers as those living within a ten-mile radius, while Merchant B may wish to define local customers as those living within a five-mile radius.

According to some embodiments, prior to, during initiation of the game, or at any time, the controller may also present instructions for play of the game. For example, the controller may display to the user, "In this game, you will see one question at a time. Each question will have four possible answer choices. To answer a question, just click your mouse pointer in the circle next to your answer choice." The controller may also provide various other instructions or information about the play of the game. For instance, the controller may indicate that the object of the game is to bring a price level up to the target price, that the current price level will be increased for every correct answer, that there will be four rounds in the game, that there is no time limit, and so on.

In one or more embodiments, a user's performance in a game may be measured by a score. For example, a user may score one point for each correct answer he selects for a question. A user may also score points based on how rapidly he answers a question, solves a puzzle, or otherwise conducts a game. At the conclusion of the game, or at some other point in the game, the score may be converted into a price level. For instance, the controller may store a predefined table that correlates all possible scores in a game to price levels. In embodiments where a score is converted to a price level, the user need not necessarily see an initial price level, and need not necessarily see a price level as it increases over the course of the game. The user may instead follow the progress of his score, and see his price level only at the end of the game once his score has been converted to a price level.

In one or more embodiments, a user may be allowed to replay a portion of a game. For example, if the user does poorly in a particular round of a game, then the user may have the opportunity to replay the round. Of course, a user may be allowed to redo any other game event. With the ability to replay a portion of a game, a user may have the opportunity to achieve a more favorable price level.

In one or more embodiments, the user may always have the opportunity to achieve a final price level equal to the target price. The user may therefore always have the opportunity to obtain one or more products for free. However, the user may be required to play a game perfectly in order to match the target price. The controller may make it difficult to match the target price by always incorporating at least one difficult game event into a game. For example, the controller may always incorporate at least one difficult question into a trivia game.

In one or more embodiments, it may be desirable to allow a user to achieve a price level equal to the target price. With a price level equal to the target price, a user would obtain one or more products without having to pay anything (although the user may still have to pay $0.25 to play). The ability to obtain a product without paying may be highly motivational for a user. However, if the user obtains a price equal to the target price, then the controller may lose money on any products the user chooses. For instance, in those embodiments in which the controller must pay for a product guarantee, but will receive no payment for the product from the user, the controller may lose money.

In one embodiment, a user must exhibit optimal play of a game in order to win a price equal to the target price. Optimal play may comprise selecting all answers correctly for all questions in a game. Such a task may be difficult for a user, and it may therefore be difficult for a user to obtain a price level equal to the target price.

In one or more embodiments, a user may have the opportunity to win a price level that is higher than the target price. For example, if the user exhibits perfect play in a game, then the user may win a price level of $1.00 above the target price. The user may thereby obtain one or more products for free. Additionally, the user may receive some benefit based on the amount by which the price level exceeds the target price. To use the prior example, the $1.00 may be added to the user's account with the controller. The $1.00 may also be paid directly to the user via check, for example. Alternatively, the $1.00 may apply towards a subsequent game. For instance, the user may begin a subsequent game with a price level of $1.00. As will be appreciated, many other benefits may be provided to the user based on the amount by which a price level in a game exceeds a target price.

In one or more embodiments, the controller may indicate to the user the relationship between the user's game performance and the amount by which a price level will increase (or between the user game performance and the new level of the price). For example, the controller may display a table indicating an amount of an increase in a credit amount corresponding to each possible number of correct answers selected by a user (e.g., in answering a question about local merchants). For instance, a Prize Meter might increase by $0.25 if the user selects exactly one correct answer choice. It will be understood that there are many other ways in which the controller might indicate to the user the relationship between game performance and the increase in user's price level. For example, the controller may indicate a function such as "credit increase=$0.25×#answers correct−$0.10."

In one or more embodiments, the controller may not indicate to the user the relationship between the user's game performance and the amount by which a game score or other performance measure will increase. The controller may store such a relationship internally without indicating it.

In one or more embodiments, a price level may represent a price the user must pay to obtain a product (similar to a Price Tag). In these embodiments, a price level may begin at the average price of products in a showcase, and may decrease over the course of the game. The user may try to bring the price level to zero, in which case the user would not have to pay for a product.

In one or more embodiments, the controller need not pay for a product guarantee or other type of entitlement. Merchants may be willing to provide entitlements to the controller for free if it means that the merchants will acquire new customers. Merchants may even pay the controller to accept product guarantees and/or to offer the merchants' products in product showcases.

In one or more embodiments, a user need not pay the gap between a final price level or credit amount and a target price out of his own pocket. Instead, the user may find a third-party merchant to pay the gap for him. In return, the user may agree to perform activities that benefit a third-party merchant. Such activities may include answering survey questions, viewing advertisements, or conducting business. For example, there may be a $2.00 gap between the user's final price level and the target price of a particular showcase. Rather than paying the $2.00 using funds from his account, the user may agree to answer ten survey questions about the desirability of a new dietary supplement. The manufacturer of the dietary supplement may, in turn, pay the $2.00 gap so that the user may obtain a product from the showcase without any financial outlay of his own.

In one or more embodiments, it may be desirable that a question, round, or other game event have more than two possible results. For example, it may be desirable that a user be able to get one, two, or three answer choices correct rather than simply getting a question right or wrong. When a game event has multiple possible results, it is possible to increase a price level or other indicator of game performance by several different corresponding amounts. It is therefore possible to create more variation in the overall results of the game. In other words, it may be possible for the user to finish with a number of different price levels. A question in which a user must select multiple answers allows for such a variation in the results of a game. Similarly, a round of a game that involves multiple questions may allow for the possibility that a user obtains zero, one, two, three, or four, or more questions correct. In Scrabble™, there may be multiple words a user can form on any given play of the game. Many other games allow for game events in which there are more than two possible results.

What is claimed is:

1. A game system for providing a local edition of an online game, the game system comprising:
   a game device;
   a game server in communication with the game device, the game server comprising:
   a processor, and
   a storage device in communication with the processor, the storage device storing instructions adapted to be executed by the processor for:
   receiving from the game device an indication of a geographic location;
   determining geographic data about a prize sponsor;
   determining game content based on the geographic location and the geographic data about the prize sponsor;
   transmitting the game content to the game device;
   determining at least one prize to offer a player based on the geographic location,
   in which determining the at least one prize to offer the player includes not selecting any prize of a category of which the player has accepted a prize within a predetermined preceding period of time;
   prior to initiating play of a local edition of an online game including the game content, displaying to the player the at least one prize;
   prior to initiating play of the local edition of the online game, receiving an indication of a selection by the player of a prize, from the at least one displayed prize, that the player will play for; and
   initiating play of the local edition of the online game,
   in which play comprises providing the player a first question about the prize selected by the player that the player will play for.

2. The game system of claim 1, further comprising:
   a second storage device in communication with the game server, the second storage device storing data that identifies a plurality of prize sponsors,
   in which each prize sponsor of the plurality of prize sponsors is associated with respective geographic data, and
   in which each prize sponsor of the plurality of prize sponsors is associated with at least one respective prize.

3. The game system of claim 1, in which determining the at least one prize to offer the player comprises:
   identifying a local prize sponsor from the plurality of prize sponsors based on the geographic location and the respective geographic data associated with each prize sponsor; and
   determining a prize to offer the player,
   in which the prize is associated with the local prize sponsor.

4. A method comprising:
   receiving information about a plurality of merchants, each merchant being associated with respective first geographic data;
   determining second geographic data that is associated with a user;
   determining a set of local products based on the first geographic data and the second geographic data;
   generating, by an electronic controller device, a local edition of a game, the local edition including a representation of at least one local product from the set of local products, in which generating comprises not selecting any local product of a category of which the user has accepted an entitlement within a predetermined preceding period of time;

determining, by the electronic controller device, a measure of performance of the user in the game;

determining, by the electronic controller device and based on the measure of performance, whether to provide the user with at least one entitlement; and prior to generating the local edition of the game, receiving, by the electronic controller device, an indication of a selection by the user of at least one entitlement, in which each at least one selected entitlement is associated with a respective local product from the set of local products, in which the local edition of the game comprises providing the user a first question about at least one entitlement selected by the player.

5. The method of claim 4, further comprising:
determining a plurality of offers based on the geographic data.

6. A method comprising:
determining geographic data that is associated with a user;
determining at least one game element based on the geographic data;
prior to initiating a game including the at least one game element, transmitting to the user an indication of a plurality of retail entitlements,
in which none of the plurality of retail entitlements is of a category of which the user has accepted a retail entitlement within a predetermined preceding period of time;
prior to initiating the game, receiving, by an electronic controller device, an indication of a selection by the user of at least one retail entitlement that the user will play for;
initiating, by the electronic controller device, the game for the user, the game including the at least one game element,
in which the game comprises providing the user a first question about a retail entitlement selected by the player to play for;
determining a measure of performance of the user;
determining whether to provide at least one retail entitlement to the user based on the measure of performance; and
providing, via the electronic controller device, at least one retail entitlement to the user.

7. The method of claim 6, in which determining the measure of performance of the user comprises:
increasing the measure of performance based on play of the game by the user.

8. The method of claim 6, in which determining the measure of performance of the user comprises:
decreasing the measure of performance based on play of the game by the user.

9. The method of claim 6, further comprising:
displaying an indication of the measure of performance to the user.

10. The method of claim 6, in which displaying the indication of the measure of performance comprises:
displaying the measure of performance using a price meter.

11. The method of claim 6, in which the measure of performance comprises a credit amount.

12. The method of claim 6, in which the measure of performance comprises a price.

13. The method of claim 6, further comprising:
determining a purchase amount for the at least one retail entitlement; and
receiving the purchase amount from the user.

14. The method of claim 13, in which determining the purchase amount comprises:
determining the purchase amount based on the measure of performance.

15. The method of claim 13, in which determining the purchase amount comprises:
determining a target price; and
subtracting the measure of performance from the target price to determine the purchase amount.

16. The method of claim 6, in which the at least one game element comprises at least one of:
an indication of a merchant,
a representation of a product,
a price of a product,
a question about a price of a product, and
an indication of a location of the user.

17. The method of claim 6, further comprising:
transmitting respective indications of a plurality of products to the user.

18. The method of claim 6, further comprising:
displaying a showcase of prizes to the user.

19. The method of claim 18, in which displaying the showcase comprises:
displaying the showcase of prizes to the user after play of the game is completed.

20. The method of claim 6, in which determining whether to provide at least one retail entitlement to the user comprises:
determining, based on the measure of performance, how many retail entitlements the user is eligible to receive.

21. The method of claim 6, further comprising:
receiving a payment from the user in exchange for the at least one retail entitlement.

22. The method of claim 6, further comprising:
determining an amount to charge the user for the at least one retail entitlement.

23. A computer-readable medium storing instructions configured to direct a processor to perform the method of claim 6.

24. An apparatus comprising:
a processor; and
the computer readable medium of claim 23 in communication with the processor.

25. A method comprising:
determining geographic data that is associated with a player;
determining a plurality of prizes based on the geographic data;
in which determining the plurality of prizes comprises not selecting any prize of a category of which the player has accepted a prize within a predetermined preceding period of time prior to initiating a game, transmitting to the user an indication of the plurality of prizes;
prior to initiating the game, receiving, by an electronic controller device, an indication of a selection by the player, from the plurality of prizes, of at least one prize that the player will play for;
initiating the game, by the electronic controller device,
in which the game comprises providing the player a first question about a prize selected by the player that the player will play for;
determining, by the electronic controller device, a measure of performance of the player in the game;

determining, by the electronic controller device and based on the measure of performance, whether to allow the player to select at least one prize from the at least one prize that the player selected to play for; and receiving, by the electronic controller device, an indication of a selection by the player of at least one prize from the at least one prize that the player selected to play for.

26. The method of claim 25, further comprising:

transmitting redemption information to the customer, the redemption information including an indication of the selected at least one prize.

27. The method of claim 26, in which the redemption information comprises information about a printable certificate.

28. The method of claim 26, in which the redemption information comprises a prize code.

29. The method of claim 26, further comprising:

storing an indication of issuance of the at least one prize to the customer.

30. The method of claim 26, further comprising:

receiving a request from a merchant to validate a retail entitlement.

31. The method of claim 30, further comprising:

determining whether the retail entitlement is valid.

32. The method of claim 31, further comprising:

transmitting to the merchant a signal that indicates whether the retail entitlement is valid.

33. A method comprising:

determining location data that is associated with a user;

determining at least one game element based on the location data;

prior to initiating a game for the user including the at least one game element, transmitting to the user an indication of a plurality of retail entitlements, in which none of the plurality of retail entitlements is of a category of which the user has accepted a retail entitlement within a predetermined preceding period of time;

prior to initiating the game, receiving, by the electronic controller device, an indication of a selection by the user of at least one retail entitlement that the user will play for;

initiating, by an electronic controller device, the game for the user, the game including the at least one game element, in which the game comprises providing the user a first question about a retail entitlement selected by the user that the user will play for;

determining a measure of performance of the user;

determining a purchase amount of at least one retail entitlement based on the measure of performance; and providing, by the electronic controller device, the user with a certificate associated with the at least one retail entitlement in exchange for the purchase amount, in which the certificate is redeemable by the user at a merchant.

34. A method comprising:

determining geographic data that is associated with a user;

determining a plurality of local merchants based on the geographic data;

determining, by an electronic controller device, a measure of performance of the user in a game;

determining, by the electronic controller device and based on the measure of performance, whether to allow the user to select at least one retail entitlement; and prior to initiating the game for the user, receiving, by the electronic controller device, an indication of a selection by the user of at least one retail entitlement, in which each at least one retail entitlement selected by the user is associated with a respective local merchant of the plurality of local merchants, in which none of the at least one selected retail entitlement is of a category of which the user has accepted a retail entitlement within a predetermined preceding period of time, and in which the game comprises providing the user a first question about a retail entitlement selected by the user.

* * * * *